(12) United States Patent
Li et al.

(10) Patent No.: US 11,791,477 B2
(45) Date of Patent: Oct. 17, 2023

(54) ROLL-TO-ROLL SOFC MANUFACTURING METHOD AND SYSTEM

(71) Applicants: UT-BATTELLE, LLC, Oak Ridge, TN (US); Redox Power Systems, LLC, Beltsville, MD (US)

(72) Inventors: Jianlin Li, Knoxville, TN (US); Dhrupadkumar P. Parikh, Knoxville, TN (US); Thomas Langdo, Great Falls, VA (US); Sean R. Bishop, Albuquerque, NM (US); Bryan M. Blackburn, Bethesda, MD (US)

(73) Assignees: UT-BATTELLE, LLC, Oak Ridge, TN (US); REDOX POWER SYSTEMS, LLC, Beltsville, MD (US)

( * ) Notice: Subject to any disclaimer, the term of this patent is extended or adjusted under 35 U.S.C. 154(b) by 0 days.

(21) Appl. No.: 17/118,261

(22) Filed: Dec. 10, 2020

(65) Prior Publication Data
US 2021/0175517 A1  Jun. 10, 2021

Related U.S. Application Data

(60) Provisional application No. 62/945,981, filed on Dec. 10, 2019.

(51) Int. Cl.
*H01M 8/00* (2016.01)
*H01M 8/1226* (2016.01)
(Continued)

(52) U.S. Cl.
CPC ......... *H01M 8/004* (2013.01); *H01M 4/8605* (2013.01); *H01M 8/1226* (2013.01);
(Continued)

(58) Field of Classification Search
CPC ............. H01M 4/8605; H01M 4/8621; H01M 4/8814; H01M 4/8835; H01M 4/8857;
(Continued)

(56) References Cited

U.S. PATENT DOCUMENTS 6,270,536 B1   8/2001  Minh
2005/0106435 A1*  5/2005  Jang ..................... H01M 4/8867
429/510
(Continued)

FOREIGN PATENT DOCUMENTS

JP   2016149314 A  *  8/2016
WO  2003075383 A2     9/2003

OTHER PUBLICATIONS

Torres-Caceres, Jonathan. "Manufacturing Of Single Solid Oxide Fuel Cells." (2013) (Year: 2013).*

(Continued)

*Primary Examiner* — Matthew T Martin
*Assistant Examiner* — Jared Hansen
(74) *Attorney, Agent, or Firm* — FOX ROTHSCHILD LLP

(57) ABSTRACT

A method of making a solid oxide fuel cell (SOFC) includes the steps of providing a first SOFC layer laminate tape comprising a first SOFC layer composition attached to a flexible carrier film layer, providing a second SOFC laminate tape comprising a second SOFC layer composition attached to a flexible carrier film layer, and providing a third SOFC layer laminate tape comprising a third SOFC layer composition attached to a flexible carrier film layer. The first SOFC layer laminate tape, the second SOFC layer laminate tape, and the third SOFC layer laminate tape are assembled on rolls positioned along a roll-to-roll assembly line. The laminate tapes are sequentially laminated and calendered and the flexible carrier films removed to provide a composite
(Continued)

SOFC precursor laminate that can be sintered and combined with a cathode to provide a completed SOFC. An assembly for making composite SOFC precursor laminates is also disclosed.

21 Claims, 25 Drawing Sheets

(51) Int. Cl.
  *H01M 8/1246* (2016.01)
  *H01M 4/86* (2006.01)
  *H01M 8/12* (2016.01)
(52) U.S. Cl.
  CPC .. *H01M 8/1246* (2013.01); *H01M 2004/8684* (2013.01); *H01M 2008/1293* (2013.01)
(58) Field of Classification Search
  CPC .. H01M 4/8889; H01M 4/8896; H01M 8/004; H01M 8/124; H01M 8/1213; H01M 8/1226; H01M 8/1246; H01M 2004/8684; H01M 2008/1293; Y02E 60/50; Y02P 70/50
  See application file for complete search history.

(56) References Cited

U.S. PATENT DOCUMENTS

| | | | |
|---|---|---|---|
| 2009/0169950 A1* | 7/2009 | Prugh | H01M 4/8807 429/410 |
| 2017/0294659 A1* | 10/2017 | Kim | H01M 8/1004 |

OTHER PUBLICATIONS

Wei, Max, et al. A total cost of ownership model for low temperature PEM fuel cells in combined heat and power and backup power applications. No. LBNL-6772E. Lawrence Berkeley National Lab. (LBNL), Berkeley, CA (United States), 2014 (Year: 2014).*
Roll to Roll (R2R) Processing Technology Assessment, Feb. 13, 2015, retrieved from https://www.energy.gov/sites/default/files/2015/02/f19/QTR%20Ch8%20-%20Roll%20To%20Roll%20Processing%20TA%20Feb-13-2015.pdf (Year: 2015).*
JP2016149314A machine English translation, Takahashi Yosuke; Inaoka Koji, "Green sheet for solid oxide fuel cell and method of manufacturing the same", retrieved from https://worldwide.espacenet.com/ Date: May 7, 2022 (Year: 2016).*
Seong, Jinwoo, et al. "Practical design guidelines for the development of high-precision roll-to-roll slot-die coating equipment and the process." IEEE Transactions on Components, Packaging and Manufacturing Technology 6.11 (2016): 1677-1686 (Year: 2016).*
Lee, Jongsu, Seongyong Kim, and Changwoo Lee. "Large area electrolyte coating through surface and interface engineering in roll-to-roll slot-die coating process." Journal of Industrial and Engineering Chemistry 76 (2019): 443-449 (Year: 2019).*
Sun et al. "Cathode materials for solid oxide fuel cells: a review", J Solid State Electrochem (2010) 14:1125-1144.
Butvar: "Polyvinyl Butyral Resin Properties & Uses", Solutia Inc., 2006.
Kim et al.: "Enhanced sinterability and electrochemical performance of solid oxide fuel cells via a roll calendering process", J. Mater. Chem. A, 2019, 7, 9958.

* cited by examiner

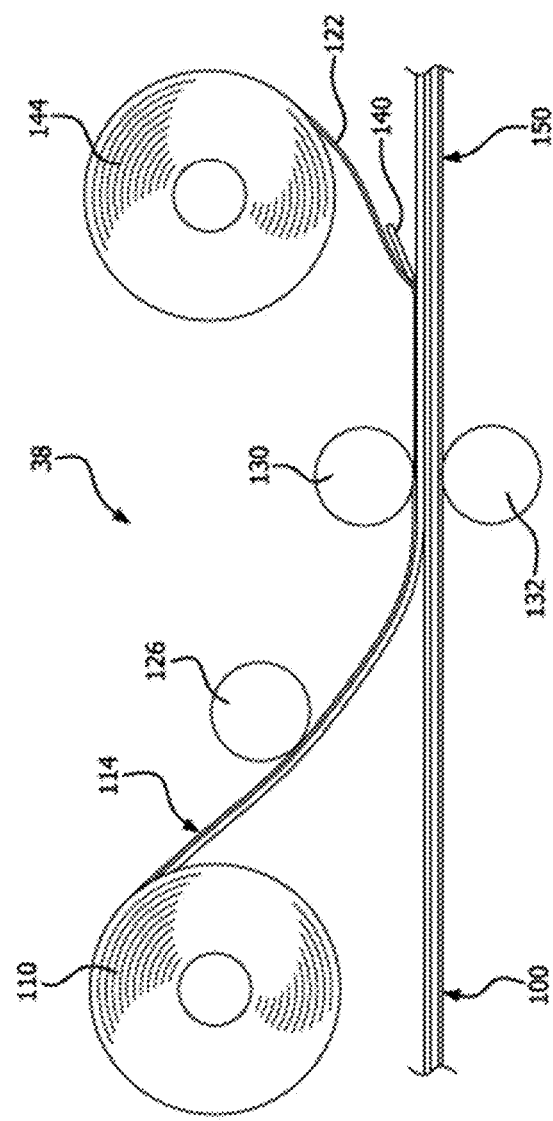

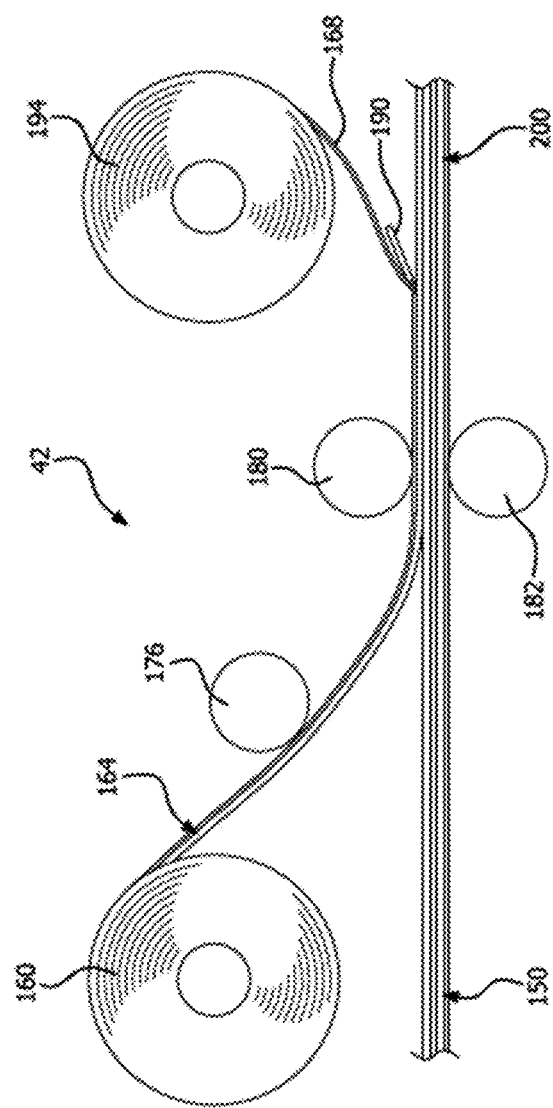

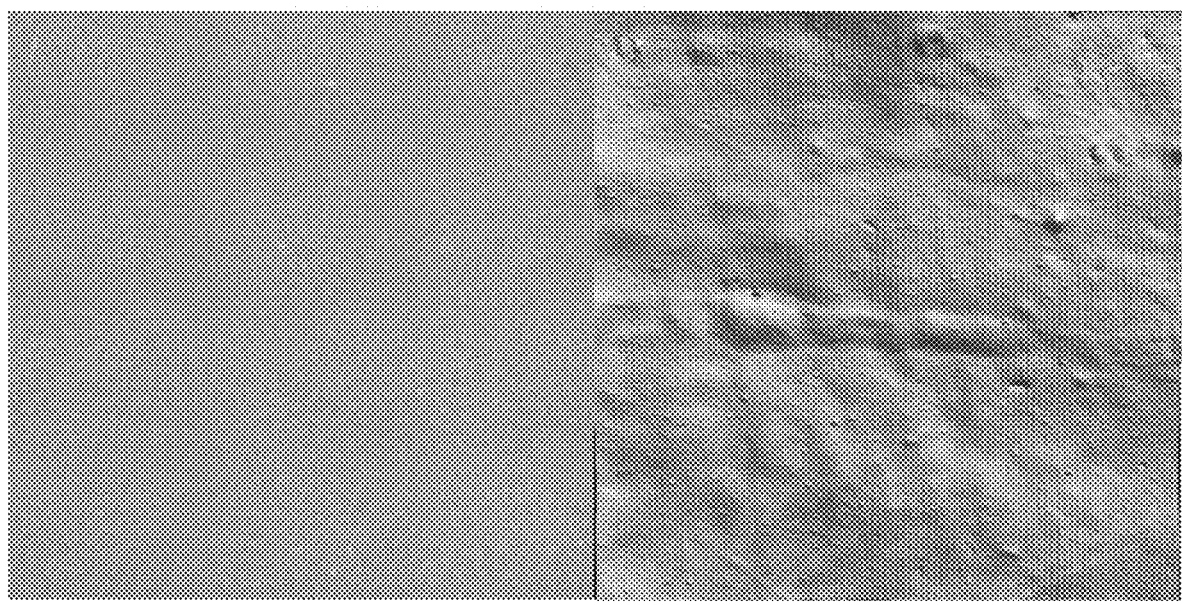
FIG. 17 A  FIG. 17 B
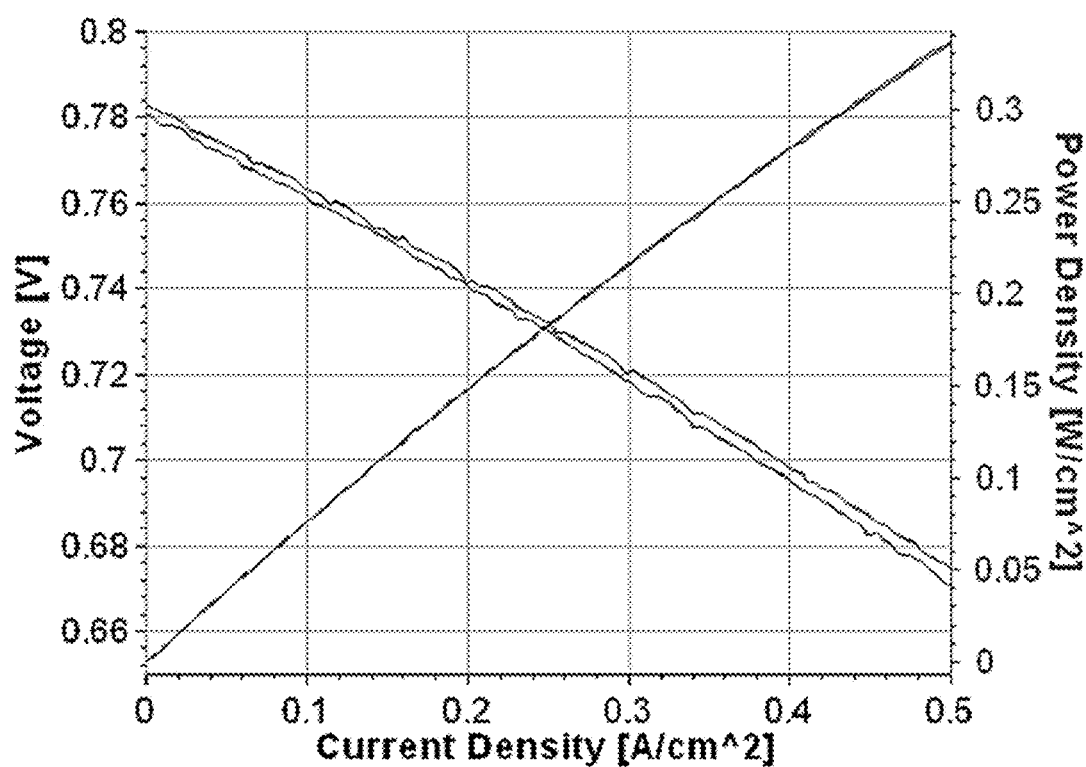
FIG. 18

ROLL-TO-ROLL SOFC MANUFACTURING METHOD AND SYSTEM

CROSS-REFERENCE TO RELATED APPLICATIONS

This application claims priority to U.S. Provisional Patent Application No. 62/945,981 filed on Dec. 10, 2019, entitled "Roll to roll SOFC Manufacturing for low cost energy generation", the entire disclosure of which incorporated herein by reference.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in this invention.

FIELD OF THE INVENTION

The present invention relates to solid oxide fuel cells, and more particularly to methods and systems for manufacturing solid oxide fuel cells. It can also be applied to other solid-state electrochemical technologies, such as solid oxide electrolyzers (SOEC) and solid electrolyte membrane (SOM) reactors.

BACKGROUND OF THE INVENTION

A solid oxide fuel cell (SOFC) converts chemical fuel directly into electricity using an oxygen ion or proton conducting membrane, denoted the electrolyte. To minimize resistance, the electrolyte should be as thin as possible while retaining a uniform, dense structure (typically ~1-30 μm for an electrode supported SOFC, although the invention is useful for anode supported, electrolyte supported and cathode supported designs). Mechanical strength is provided to the thin membrane by supporting it on a support layer. A functional layer that provides high electrochemical activity is placed between the support and electrolyte layers. There is a continuing need for improvements in manufacturing methods and systems to make SOFCs more economically, especially at higher production volumes.

SUMMARY OF THE INVENTION

A method of making a solid oxide fuel cell (SOFC) can include the steps of:

providing a first SOFC layer laminate tape comprising a first SOFC layer composition attached to a flexible carrier film layer;

providing a second SOFC laminate tape comprising a second SOFC layer composition attached to a flexible carrier film layer;

providing a third SOFC layer laminate tape comprising a third SOFC layer composition attached to a flexible carrier film layer;

assembling the first SOFC layer laminate tape, the second SOFC layer laminate tape, and the third SOFC layer laminate tape on rolls positioned along a roll-to-roll assembly line;

continuously positioning adjacent to one another and moving the first SOFC layer laminate tape, and the second SOFC layer laminate tape, with the respective flexible carrier film layers facing outward, to create a SOFC precursor laminate having a first thickness;

passing the SOFC precursor laminate through a calender to reduce the thickness of the SOFC precursor laminate to a second thickness less than the first thickness;

continuously removing one of the respective tape layers from the SOFC precursor laminate, the other of the tape layers of the SOFC precursor laminate remaining;

continuously moving and positioning adjacent to one another the SOFC precursor laminate and the third SOFC layer laminate tape, with the respective tape layers facing outward, to create a composite SOFC precursor laminate comprising the SOFC precursor laminate and the third SOFC layer laminate tape, the composite SOFC precursor laminate having a first thickness; and, calendering the composite SOFC precursor laminate to reduce the first thickness to a second thickness less that the first thickness.

The first SOFC layer composition, the second SOFC layer composition, and the third SOFC layer composition can comprise, interchangeably, an anode support layer composition, an anode functional layer composition, and an electrolyte layer composition.

The method can include the steps of:

providing the first SOFC layer laminate tape comprises providing an anode support layer laminate tape comprising an anode support layer attached to a flexible support tape layer;

providing the second SOFC layer laminate tape comprises providing an anode functional layer laminate tape comprising an anode functional layer attached to a flexible anode tape layer;

providing the third SOFC layer laminate tape comprises providing an electrolyte layer laminate tape comprising an electrolyte layer attached to a flexible electrolyte tape layer;

assembling the anode support layer laminate tape, the anode functional layer laminate tape, and the electrolyte layer laminate tape on rolls positioned along a roll-to-roll assembly line;

continuously positioning adjacent to one another and moving the anode functional layer laminate tape, and one of the electrolyte layer laminate tape and the support layer laminate tape, with the respective tape layers facing outward, to create an anode precursor laminate having a first thickness;

passing the anode precursor laminate through a calender to reduce the thickness of the anode precursor laminate to a second thickness less than the first thickness;

continuously removing one of the respective tape layers from the anode precursor laminate, the other of the tape layers of the anode precursor laminate remaining;

continuously moving and positioning adjacent to one another the anode precursor laminate, and the other of the electrolyte layer laminate tape and the support layer laminate tape, with the respective tape layers facing outward, to create a composite fuel cell precursor laminate comprising the support layer, the anode layer, and the electrolyte layer, the composite fuel cell precursor layer having a first thickness; and, calendering the composite fuel cell precursor laminate to reduce the first thickness to a second thickness less that the first thickness.

The method can include the step of removing the flexible carrier film from the composite SOFC precursor laminate. The method can include the step of applying a cathode layer to the composite SOFC precursor laminate to form a solid oxide fuel cell assembly. A solid oxide fuel cell can be constructed with the solid oxide fuel cell assembly. The method can further include the step of sintering the composite SOFC precursor laminate.

The method can also include the step of providing an anode support layer laminate tape comprises the step of providing an anode support layer slurry, depositing the anode support layer slurry on a flexible support tape; and drying the anode support layer slurry to form the anode support layer precursor tape; and the step of providing an anode functional layer laminate tape comprises the steps of providing an anode functional layer slurry, depositing the anode functional layer slurry on a flexible anode tape, and drying the anode functional layer slurry to form the anode functional layer precursor tape; and the step of providing an electrolyte layer laminate tape comprises the steps of providing an electrolyte layer slurry, depositing the electrolyte layer slurry onto a flexible electrolyte tape, and drying the electrolyte layer slurry to form the electrolyte layer precursor tape.

At least one of the first, second and third SOFC layer compositions can be deposited onto the flexible carrier film by at least on selected from the group consisting of slot die coating, dip coating, tape casting, and screen printing.

At least one of the first, second and third SOFC layer compositions can comprise a binder. The binder can be at least one selected from the group consisting of polyvinyl butyral (PVB) and polyvinyl alcohol (PVA), polyethyl methacrylate, cellulose acetate, and polyvinyl alcohol.

The removal of the flexible carrier film layer from one of the first SOFC layer laminate tape, the second SOFC layer laminate tape, and the third SOFC layer laminate tape can be performed by at least one selected from the group consisting of scraping and peeling.

The roll-to-roll assembly line can have a line speed of between 0.1 to 20 m/min. The method can be performed at temperatures of between 0 to 250° C. After each lamination step the laminated layers can be calendered to reduce the thickness between 0.1-40%. The method can further comprise cutting the rolls of the SOFC precursor laminate into SOFC coupons, and sintering the SOFC coupons for a predetermined sintering-time interval over a predetermined sintering-temperature range.

The SOFC precursor laminate can have a porosity of from 1% to 50%. The SOFC precursor laminate can have a porosity of from 1% to 40%. The SOFC precursor laminate can have a porosity of from 1% to 30%. The SOFC precursor laminate can have a porosity of from 1% to 20%.

A method for fabricating rolls of a solid oxide fuel cell (SOFC) structure, wherein the SOFC structure comprises a stack of N≥3 layers arranged in a particular sequence, and the N layers comprise support and functional anode layers, and at least one electrolyte layer, can include the steps of:

for each layer of the N layers, producing a roll of the layer of the SOFC structure;

selectively laminating one or more pairs of rolls of layers of the SOFC structure that are adjacent in the particular sequence to obtain respective one or more rolls of a corresponding laminated pair of layers; and iteratively obtaining a roll of a laminated stack of M layers of the SOFC structure, while 3≤M≤N, by either selectively laminating an unpaired roll of a layer of the SOFC and a roll of a laminated stack of (M−1) layers of the SOFC structure, one of the outer layers of the laminated (M−1)-layer stack being adjacent to the layer in the particular sequence, or selectively laminating a roll of a laminated stack of j layers of the SOFC structure and a roll of a laminated stack of (M−j) layers of the SOFC structure, where 2≤j≤(M−2), one of the outer layers of the laminated j-layer stack being adjacent to one of the outer layers of the laminated (M−j)-layer stack.

A method for fabricating rolls of a solid oxide fuel cell (SOFC) structure, wherein the SOFC structure comprises a stack of N≥3 layers arranged in a particular sequence, and the N layers comprise support and functional anode layers, and at least one electrolyte layer, can include the steps of:

forming k≥2 rolls, at least one of which being a multilayer stack of deposited layers, wherein the forming of the K rolls is performed by selectively depositing, for each $j^{th}$ roll, $M_j$ layers on a $j^{th}$ substrate in accordance with the particular sequence to form the $j^{th}$ roll of an $M_j$-layer stack, where 1≤j≤K, $M_j$≥2 for at least one j, and $M_{1+\ldots+}M_K=N$; and iteratively obtaining a roll of a laminated stack of M layers of the SOFC structure, while 3≤M≤N, by either selectively laminating a roll of a single layer of the SOFC and a roll of a laminated stack of (M−1) layers of the SOFC structure, one of the outer layers of the laminated (M−1)-layer stack being adjacent to the layer in the particular sequence, or selectively laminating a roll of a stack of $M_j$ deposited layers of the SOFC structure and a roll of a laminated stack of (M−$M_j$) layers of the SOFC structure, where 2≤$M_j$≤(M−2), one of the outer layers of the $j^{th}$ deposited-layer stack being adjacent to one of the outer layers of the laminated (M−$M_j$)-layer stack.

The method can include the operation of selectively laminating a roll of a single layer with another roll of a single layer is performed based on laminability of the layers, the operation of selectively laminating a roll of a single layer with another roll of a layer stack is performed based on laminability of the layer and layer stack, and the operation of selectively laminating a roll of a layer stack with another roll of another layer stack is performed based on laminability of the layer stacks.

A solid oxide fuel cell (SOFC) structure can include an anode structure comprising one or more anode support layers, and one or more anode functional layers, and an electrolyte structure comprising at least one electrolyte layer. The anode functional layers can be stacked between the anode support layers and the electrolyte layer. The anode structure and the electrolyte structure can have porosities in the range of 1% to 50%.

The SOFC structure can be configured as a roll. The SOFC structure can be configured as a coupon having a predetermined width and a predetermined length along directions perpendicular to the stack direction.

An assembly for making an SOFC, comprising:

a first roll of a first SOFC layer laminate tape comprising a first SOFC layer composition attached to a flexible carrier film layer;

a second roll of a second SOFC laminate tape comprising a second SOFC layer composition attached to a flexible carrier film layer;

a third roll of a third SOFC layer laminate tape comprising a third SOFC layer composition attached to a flexible carrier film layer;

the first, second, and third rolls being positioned along a roll-to-roll assembly line;

positioning structure for continuously positioning adjacent to one another and moving the first SOFC layer laminate tape, and the second SOFC layer laminate tape, with the respective flexible carrier film layers facing outward, to create a SOFC precursor laminate having a first thickness;

a calender for reducing the thickness of the SOFC precursor laminate to a second thickness less than the first thickness;

a removal device for continuously removing one of the respective tape layers from the SOFC precursor laminate, the other of the tape layers of the SOFC precursor laminate remaining;

positioning structure for positioning adjacent to one another the SOFC precursor laminate and the third SOFC layer laminate tape, with the respective tape layers facing outward, to create a composite SOFC precursor laminate comprising the SOFC precursor laminate and the third SOFC layer laminate tape, the composite SOFC precursor laminate having a first thickness; and, a calender for calendering the composite SOFC precursor laminate to reduce the first thickness to a second thickness less that the first thickness.

A method of making a solid oxide fuel cell (SOFC) can include the steps of:

providing a first SOFC layer laminate tape comprising a first SOFC layer composition attached to a flexible carrier film layer;

providing a second SOFC laminate tape comprising a second SOFC layer composition attached to a flexible carrier film layer;

assembling the first SOFC layer laminate tape and the second SOFC layer laminate tape on rolls positioned along a roll-to-roll assembly line;

continuously positioning adjacent to one another and moving the first SOFC layer laminate tape, and the second SOFC layer laminate tape, with the respective flexible carrier film layers facing outward, to create a SOFC precursor laminate having a first thickness;

passing the SOFC precursor laminate through a calender to reduce the thickness of the SOFC precursor laminate to a second thickness less than the first thickness; and, continuously removing one of the respective tape layers from the SOFC precursor laminate, the other of the tape layers of the SOFC precursor laminate remaining.

BRIEF DESCRIPTION OF THE DRAWINGS

There are shown in the drawings embodiments that are presently preferred it being understood that the invention is not limited to the arrangements and instrumentalities shown, wherein:

FIG. 3B is an enlargement of area FIG. 3B in FIG. 2; and FIG. 3C is an enlargement of area FIG. 3C in FIG. 2.

FIG. 17A shows the Optical profilometry images of the electrolyte surface of the large gap cell used in SOFC testing; FIG. 17B shows the profilometry image of the electrolyte surface of the large gap cell used in SOFC testing. The profilometry image is magnified 9 kx in the out-of-plane direction to aid in defect detection.

FIG. 18 is a plot of voltage (V) and power density (W/cm$^2$) vs. current density (A/cm$^2$) for a medium gap SOFC measured at 650° C. after 150 h of operation.

DETAILED DESCRIPTION OF THE INVENTION

Figure 1:
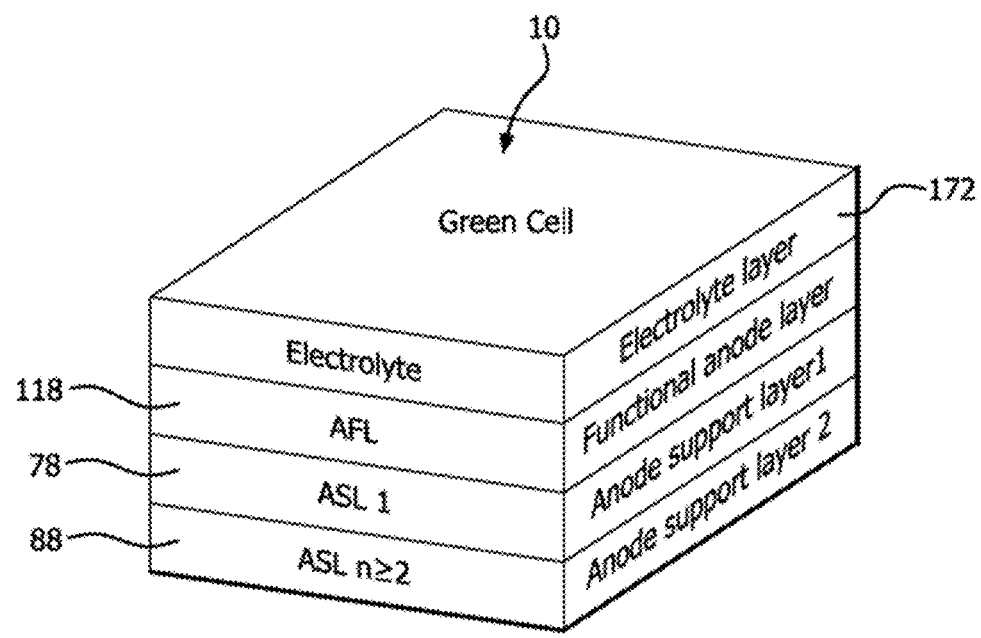
FIG. 1 is a schematic illustration of a green SOFC laminate structure with anode supported configuration according to the invention.

SOFCs are utilized herein as exemplary devices in descriptions of embodiments of the present invention, but it should be understood that embodiments of the invention also encompass other types of solid-state electrochemical cells. For example, a second type of solid-state electrochemical cell is known as a solid-oxide electrolyzer cell (SOEC), which resembles an SOFC that runs in reverse. In other words, the SOEC takes electricity as an input to drive the reverse reaction of the SOFC, where water (and/or carbon dioxide) is converted into hydrogen (and/or carbon monoxide) at the fuel (or hydrogen) electrode and oxygen at the oxygen electrode. When the electrolyte in the SOEC is a proton conductor, the oxygen electrode may also be called a steam electrode. The SOEC is an electrolytic cell involving the transformation of electrical energy into chemical energy, whereas the SOFC is a galvanic cell involving the transformation of chemical energy into electrical energy. Like the SOFC, the SOEC typically operates between 500° C. and 800° C. (or potentially as low as approximately 400° C.) and is a layered structure including, consisting essentially of, or consisting of a solid oxide (ceramic) electrolyte, a fuel electrode, and an oxygen electrode. For example, in electrolytic, SOEC mode, the fuel electrode is the cathode, and the oxygen electrode is the anode. The most common electrolyte of SOECs, similar to SOFCs, is a dense ionic conductor that includes yttria stabilized zirconia (YSZ). Some other choices are scandia-stabilized zirconia (ScSZ), doped ceria-based electrolytes, or lanthanum gallate materials. The most common fuel-electrode material is a Ni-YSZ cermet. A cermet is a metal-ceramic composite material. Perovskite-type lanthanum strontium manganese (LSM) is one of the most common oxygen-electrode materials, though other materials are possible. SOECs may be planar or tubular just like SOFCs. SOEC electrolytes may also conduct protons rather than oxygen ions. Furthermore, the SOEC may in certain cases be exactly the same as the SOFC and used in both SOFC mode and SOEC mode. This is known as a reversible or regenerative fuel cell.

A third type of solid-state electrochemical cell is known as solid oxide membrane (SOM) reactor, or an electrocatalytic reactor. The reactors have two chambers that are separated by a solid oxide, gas-tight ceramic electrolyte or membrane that is capable of transporting oxide ions (and/or protons) at elevated temperatures (typically between 600° C. and 1,000° C.). Such electrochemical cells may operate in electrolytic mode to convert input feedstock chemicals (e.g., $CH_4$) into other higher value chemicals (e.g., ethylene) and/or reactions may be driven through pressure or concentration gradients on either side of the membrane. Catalysts in each chamber may increase selectivity to a product by offering reaction sites and/or creating reaction pathways that are more favorable to certain products than others. SOM reactors have also been used to drive partial oxidation reactions of methane to form syngas (mostly hydrogen and carbon monoxide), oxidative coupling of methane (OCM) to form ethane and ethylene, and even the generation of high-purity oxygen from air. SOM reactors may be planar or tubular just like SOFCs.

The disclosure and embodiments of the invention apply to solid oxide electrochemical cell devices other than SOFCs, including "SOECs," reversible or regenerative SOFCs, "SOMs," electrocatalytic reactors, or other solid-state electrochemical cells and related devices. Herein, references to SOFCs may be understood to include and encompass "SOECs", reversible or regenerative SOFCs, "SOMs", electrocatalytic reactors, or other solid-state electrochemical cells and related devices, unless otherwise indicated. A method of making a solid oxide fuel cell (SOFC) can include the steps of providing a first SOFC layer laminate tape comprising a first SOFC layer composition attached to a flexible carrier film layer, providing a second SOFC laminate tape comprising a second SOFC layer composition attached to a flexible carrier film layer, and providing a third SOFC layer laminate tape comprising a third SOFC layer composition attached to a flexible carrier film layer. The first SOFC layer laminate tape, the second SOFC layer laminate tape, and the third SOFC layer laminate tape are assembled on rolls positioned along a roll-to-roll assembly line. The method includes continuously positioning adjacent to one another and moving the first SOFC layer laminate tape, and the second SOFC layer laminate tape, with the respective flexible carrier film layers facing outward, to create a SOFC precursor laminate having a first thickness. The SOFC precursor laminate is passed through a calender to reduce the thickness of the SOFC precursor laminate to a second thickness less than the first thickness. One of the respective tape layers is continuously removed from the SOFC precursor laminate, the other of the tape layers of the SOFC precursor laminate remaining. The method includes continuously moving and positioning adjacent to one another the SOFC precursor laminate and the third SOFC layer laminate tape, with the respective tape layers facing outward, to create a composite SOFC precursor laminate comprising the SOFC precursor laminate and the third SOFC layer laminate tape, the composite SOFC precursor laminate having a first thickness. The composite SOFC precursor laminate is calendered to reduce the first thickness to a second thickness less than the first thickness.

The first SOFC layer composition, the second SOFC layer composition, and the third SOFC layer composition can comprise, interchangeably, an anode support layer (ASL) composition, an anode functional layer (AFL) composition, and an electrolyte layer composition.

The providing of the first SOFC layer laminate tape can comprise providing an ASL laminate tape comprising an ASL composition attached to a flexible support tape layer. The providing of the second SOFC layer laminate tape can comprise providing an AFL laminate tape comprising an AFL composition attached to a flexible anode tape layer. The providing of the third SOFC layer laminate tape can comprise providing an electrolyte layer laminate tape comprising an electrolyte layer composition attached to a flexible electrolyte tape layer. The ASL laminate tape, the AFL laminate tape, and the electrolyte layer laminate tape can be assembled on rolls or other supply devices positioned along a roll-to-roll or continuous assembly line. The method can include continuously positioning adjacent to one another and moving the AFL laminate tape, and one of the electrolyte layer laminate tape and the ASL laminate tape, with the respective flexible carrier film layers facing outward, to create an anode precursor laminate having a first thickness. The anode precursor laminate can be passed through a calender to reduce the thickness of the anode precursor laminate to a second thickness less than the first thickness. One of the respective flexible carrier film layers can be continuously removed from the anode precursor laminate, the other of the tape layers of the anode precursor laminate remaining. The method can include continuously moving and positioning adjacent to one another the anode precursor laminate, and the other of the electrolyte layer laminate tape and the ASL laminate tape, with the respective tape layers facing outward, to create a composite SOFC precursor laminate comprising the anode support layer, the anode functional layer, and the electrolyte layer, the composite SOFC precursor laminate having a first thickness. The composite SOFC precursor laminate can be calendered to reduce the first thickness to a second thickness less than the first thickness.

The method can include the step of removing the remaining flexible carrier film from the composite SOFC precursor laminate. The method can further include the step of applying a cathode layer to the composite SOFC precursor laminate to form a SOFC assembly. The method can include the step of constructing a solid oxide fuel cell with the SOFC assembly.

The method can include the step of providing an ASL laminate tape and can comprise the step of providing an ASL composition slurry, depositing the ASL composition slurry on a flexible support tape; and drying the ASL composition slurry to form the ASL laminate tape. The method can include the step of providing an AFL laminate tape and can comprise the steps of providing an AFL composition slurry, depositing the AFL composition slurry on a flexible carrier film, and drying the AFL composition slurry to form the AFL laminate tape. The AFL slurry in one embodiment consists of GDC, NiO, fish oil (dispersant), BBP-S-160 plasticizer, PVB-B-98 polyvinyl Butyral (binder), and ethanol and toluene (solvent). The step of providing an electrolyte layer laminate tape can comprise the steps of providing an electrolyte layer composition slurry, depositing the electrolyte layer composition slurry onto a flexible carrier film, and drying the electrolyte layer composition slurry to form the electrolyte layer laminate tape.

At least one of the first, second and third SOFC layer compositions can be deposited onto the flexible carrier film by at least on selected from the group consisting of slot die coating, dip coating, tape casting, spray coating and screen printing.

The material making the flexible carrier film, also known as a carrier film or surface (i.e., a substrate for the SOFC layer), can be varied. Suitable materials include polymer films (e.g., mylar/polyester, Teflon, or polypropylene films), metal foils or belts (e.g., polished stainless steel carbon steel), various papers (e.g., wood pulp), or fiber mats (e.g., carbon fiber or fiberglass). The flexible carrier film should typically be flexible with appropriate mechanical strength for the roll-to-roll process. Such properties allow the flexible carrier film to adjust to slight differences in alignment (in the x-, y-, and/or z-axis) between different segments of the equipment used to deposit the SOFC layer compositions or laminate said layers together. For instance, the flexibility can allow for misalignments between segments of equipment varying from 1 micron to 5000 microns, or from 1 microns to 1000 microns, or even from 5 microns to 500 microns. The flexible carrier film should also typically have surface properties that allow the SOFC layer or layers to be easily peeled off, or released, from the flexible carrier film. The surface properties of the flexible carrier film can be enhanced with the use of a flexible carrier film having a coating, such as silicone (e.g., silicone oil), Teflon, lecithin, or waxes (e.g., parrafin wax). The flexible carrier film typically has a thickness between approximately 25 microns and approximately 400 microns, or approximately 25 microns to approximately 200 microns, or even approximately 50 microns to approximately 150 microns.

The removal of the flexible carrier film layer from one of the first SOFC layer laminate tape, the second SOFC layer laminate tape, and the third SOFC layer laminate tape is performed by at least one selected from the group consisting of scraping and peeling. Such flexible carrier film removal processes may be initiated or assisted by the use of various tools, including blades and vacuum or suction devices. Other tape removal processes are possible.

The line speed of the continuously moving or roll-to-roll assembly line can vary. The roll-to-roll assembly line can have a line speed of between approximately 0.1 to approximately 20 m/min. The roll-to-roll assembly may also have a line speed of between approximately 0.1 to approximately 15 m/min, or even a line speed between approximately 0.2 to approximately 12 m/min.

The temperature at which the process is performed can vary. The method can be performed at temperatures of between 0 to 250° C. depending on the binder and plasticizer properties, such as glass transition temperature and solvent evaporation rate. The method can include the step of binder burn out and sintering the composite SOFC precursor laminate. The binder burnout temperature typically occurs between approximately 300° C. and 600° C. The sintering temperature can be from approximately 900° C. and approximately 1500° C., or between approximately 1100° C. and 1500° C., or even between approximately 1200° C. and approximately 1500° C.

The extent of calendering can vary. After each lamination step the laminated layers are calendered to reduce the thickness between 0.1-40%. The extent of calendering after a lamination step can be 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21', 22, 23, 24, 25, 26, 27, 28, 29, 30, 31, 32, 33, 34, 35, 36, 37, 38, 39, or 40%, or can be within a range of any high value and low value selected from these values. The term calendering as used herein also includes other suitable methods of applying pressure to the laminate to reduce the thickness. The calender gap is the distance between the two rollers. The calender gap can be between approximately 25 microns and approximately 600 microns, or approximately 50 microns and approximately 500 microns, or even approximately 75 microns and approximately 500 microns. The calender gap can spatially vary (i.e., be non-uniform), typically with variations of gap size of approximately ±1% to approximately 15% of the average gap thickness in the x-axis, y-axis, or z-axis of the calendar rollers.

The method can further include cutting the rolls of the SOFC precursor laminate into SOFC coupons, and sintering the SOFC coupons for a predetermined sintering-time interval over a predetermined sintering-temperature range. The SOFC coupons may consist of a single, discrete SOFC, or a plurality of SOFCs (e.g., four SOFCs in a 2 by 2 array). The plurality of SOFCs can be singulated after sintering using a variety of methods, including the use of diamond saws or lasers for cutting.

The SOFC precursor laminate can have a porosity of from 1% to 50%. The individual layers (ASL, AFL, electrolyte) comprising the SOFC precursor laminate can individually or collectively have a porosity of from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50%, or can have a porosity within a range of any high value and low value selected from these values. The SOFC precursor laminate can have a porosity from 1% to 40%. The SOFC precursor laminate can have a porosity of from 1% to 30%. The SOFC precursor laminate can have a porosity of from 1% to 20%.

An assembly for making an SOFC can include a first roll of a first SOFC layer laminate tape comprising a first SOFC layer composition attached to a flexible carrier film layer, a second roll of a second SOFC laminate tape comprising a second SOFC layer composition attached to a flexible carrier film layer, and a third roll of a third SOFC layer laminate tape comprising a third SOFC layer composition attached to a flexible carrier film layer. The first, second, and third rolls can be positioned along a roll-to-roll assembly line. Positioning structure is provided for continuously positioning adjacent to one another and moving the first SOFC layer laminate tape, and the second SOFC layer laminate tape, with the respective flexible carrier film layers facing outward, to create a SOFC precursor laminate having a first thickness. A calender reduces the thickness of the SOFC precursor laminate to a second thickness less than the first thickness. A removal device is provided for continuously removing one of the respective tape layers from the SOFC precursor laminate, the other of the tape layers of the SOFC precursor laminate remaining. Positioning structure is provided for positioning adjacent to one another the SOFC precursor laminate and the third SOFC layer laminate tape, with the respective tape layers facing outward, to create a composite SOFC precursor laminate comprising the SOFC precursor laminate and the third SOFC layer laminate tape, the composite SOFC precursor laminate having a first thickness. A calender is provided for calendering the composite SOFC precursor laminate to reduce the first thickness to a second thickness less that the first thickness.

The invention includes a method for fabricating rolls of a SOFC structure, wherein the SOFC structure comprises a stack of N≥3 layers arranged in a particular sequence, and the N layers comprise support and functional anode layers, and at least one electrolyte layer. The method includes:

(a) for each layer of the N layers, producing a roll of the layer of the SOFC structure;

(b) selectively laminating one or more pairs of rolls of layers of the SOFC structure that are adjacent in the particular sequence to obtain respective one or more rolls of a corresponding laminated pair of layers; and (c) iteratively obtaining a roll of a laminated stack of M layers of the SOFC structure, while 3≤M≤N, by (d) either selectively laminating an unpaired roll of a layer of the SOFC and a roll of a laminated stack of (M−1) layers of the SOFC structure, one of the outer layers of the laminated (M−1)-layer stack being adjacent to the layer in the particular sequence, or (e) selectively laminating a roll of a laminated stack of j layers of the SOFC structure and a roll of a laminated stack of (M−j) layers of the SOFC structure, where 2≤j≤(M−2), one of the outer layers of the laminated j-layer stack being adjacent to one of the outer layers of the laminated (M−j)-layer stack.

The invention can include a method for fabricating rolls of a SOFC structure, wherein the SOFC structure comprises a stack of N≥3 layers arranged in a particular sequence, and the N layers comprise support and functional anode layers, and at least one electrolyte layer. The method includes:

(a) forming k≥2 rolls, at least one of which being a multilayer stack of deposited layers, wherein the forming of the K rolls is performed by (b) selectively depositing, for each jth roll, Mj layers on a jth substrate in accordance with the particular sequence to form the jth roll of an Mj-layer stack, where 1≤j≤K, Mj≥2 for at least one j, and M1+ . . . +MK=N; and (c) iteratively obtaining a roll of a laminated stack of M layers of the SOFC structure, while 3≤M≤N, by (d) either selectively laminating a roll of a single layer of the SOFC and a roll of a laminated stack of (M−1) layers of the SOFC structure, one of the outer layers of the laminated (M−1)-layer stack being adjacent to the layer in the particular sequence, or (e) selectively laminating a roll of a stack of Mj deposited layers of the SOFC structure and a roll of a laminated stack of (M−Mj) layers of the SOFC structure, where 2≤Mj≤(M−2), one of the outer layers of the jth deposited-layer stack being adjacent to one of the outer layers of the laminated (M−Mj)-layer stack.

The operation of selectively laminating a roll of a single layer with another roll of a single layer can be performed based on laminability, such as compressibility, robustness, adhesion strength to the adjacent layer, of the layers. A laminate with good laminability will result in a sintered SOFC which does not delaminate during sintering or subsequent normal operation as an SOFC device. The operation of selectively laminating a roll of a single layer with another roll of a layer stack is performed based on laminability of the layer and layer stack. The operation of selectively laminating a roll of a layer stack with another roll of another layer stack is performed based on laminability of the layer stacks.

A solid oxide fuel cell (SOFC) structure may be anode supported, meaning that the anode support layer is the thickest portion of the device (i.e., the substrate), and which supports the other layers. The anode supported SOFC structure includes an anode structure comprising one or more anode support layers, and one or more anode functional layers; and an electrolyte structure comprising at least one electrolyte layer. The anode functional layers are stacked between the anode support layers and the electrolyte layer, and the anode structure and the electrolyte structure have porosities in the range of 1% to 50%. The SOFC structure can be configured as a roll. The SOFC structure can be configured as a coupon having a predetermined width and a predetermined length along directions perpendicular to the stack direction.

In various embodiments of the invention, the cathode includes, consists essentially of, or consists of, for example, one or more of the following materials: lanthanum manganites such as lanthanum strontium manganite (LSM, e.g., $La_{1-x}Sr_xMnO_{3-\delta}$) and lanthanum calcium manganite (LCM, e.g., $La_{1-x}Ca_xMnO_{3-\delta}$); manganites such as $Ln_{1-x}Sr_xMnO_{3-\delta}$ (Ln=La, Pr, Nd, Sm, Gd, Yb, or Y; and); cobaltites such as $Ln_{1-x}Sr_xCoO_{3-\delta}$ (Ln=La, Pr, Nd, Sm, or Gd), lanthanum strontium cobaltite (LSC, e.g., $La_{1-x}Sr_xCo_{3-\delta}$), samarium strontium cobaltite (SSC, e.g., $Sm_{0.5}Sr_{0.6}CoO_{3-\delta}$), and strontium cerium cobaltite (SCC, e.g. $Sr_{0.9}Ce_{0.1}CoO_{3-\delta}$); ferrites such as lanthanum ferrite (e.g., $LaFeO_3$), Sr-doped lanthanum ferrite (e.g., $La_{3.8}Sr_{0.2}FeO_3$), lanthanum strontium cobalt ferrite (LSCF, e.g., $La_{0.6}Sr_{0.4}Co_{0.8}Fe_{0.2}O_{3-\delta}$), praseodymium strontium cobalt ferrite (PSCF, e.g., $Pr_{1-x}Sr_xCo_{0.8}Fe_{0.2}O_{3-\delta}$), and barium strontium cobalt ferrite (BSCF, e.g., $Ba_{0.5}Sr_{0.5}Co_{0.8}Fe_{0.2}O_{3-\delta}$); nickelates such as iron-doped nickelate (LNF, e.g., $LaFe_{1-x}Ni_xO_{3-\delta}$) and Sr-doped LNF (LSNF); and cathode materials with the $K_2NiF_4$ type structure such as $La_2BO_4$ (B=Co, Ni, Cu), alkaline- (e.g., Sr, Ba, Ca) and rare earth (e.g., Nd or Pr) doping at the La site such as $La_2Ni_{1-x}CoO_{4+\delta}$, and transition metal (e.g., Cu or Co) doping at the Ni site, Cathode materials may be pure electronic conductors, or they may be mixed ionic electronic conductors (MIECs) in which the electronic conductor may be an electron or hole.

In general, the solid electrolyte is a dense ceramic material that conducts oxygen ions while minimizing electronic conduction therewithin in order to prevent current leakage and corresponding electrical losses. However, a solid electrolyte may also conduct protons (i.e., $H^+$ ions) or other types of ions (e.g., $Na^+$ ion conductors such as $Na_3Zr_2Si_2PO_{12}$, or NASICON). Electrolyte materials may be pure ion conductors, or they may be MIECs. The electrolyte may include, consist essentially of, or consist of multiple layers of different electrolyte materials (e.g., two different oxygen ion conductor layers, or an oxygen ion conductor layer and proton conductor layer). The thickness of the solid electrolyte may range from, for example, approximately 500 nm to approximately 40 µm, or 1 µm to approximately 40 µm, or 5 µm to approximately 30 µm, or even from approximately 10 µm to approximately 30 µm.

In various embodiments of the invention, the electrolyte 120 includes, consists essentially of, or consists of, for example, one or more of the following oxygen ion conducting materials: zirconia-based solid electrolytes such as zirconia stabilized with one or more of alkaline or rare earth dopants such as Y, Sc, Ce, Ca, Mg, or Al (e.g., $Zr_{1-x}Y_xO_{2-x/2}$ and $Zr_{1-x}Sc_xO_{2-x/2}$); ceria electrolytes doped with one or more alkaline or rare earth dopants such as Y, Yb, Sc, Ca, Mg, Zr, Gd, Sm Y, La, Pr, Sm, Nd, Ba, or Sr (e.g., $Ce_{1-x}M_xO_{2-\delta}$, M=Gd or Sm, x=0.1-0.2); $LaGaO_3$-based electrolytes such as lanthanum strontium gallium magnesium oxide (LSGM, e.g., $La_{1-x}Sr_xGa_{1-y}Mg_yO_{3-\delta}$); bismuth oxide-based materials (e.g., $Bi_{0.8}Er_{0.2}O_{1.5}$, $Bi_2Sr_2Nb_2GaO_{11.5}$, $Bi_{0.88}Dy_{0.08}W_{0.04}O_{1.5}$ and $Bi_2V_{0.9}Cu_{0.1}O_{5.5-\delta}$); perovskites based on $LnBO_3$ (B=Al, In, Sc, Y); pyrochlores and fluorite-type materials $(Y,Nb,Zr)O_{2-\delta}$; materials based on $La_2Mo_2O_9$ (LAMOX, e.g., $La_2Mo_2O_9$, $La_{1.7}Bi_{0.3}Mo_2O_9$, and $La_2Mo_{1.7}W_{0.3}O_9$; perovskite- and brownmillerite-like phases derived from $Ba_2In_2O$ (e.g., $Ba_2In_2O_5$; apatite-type phases $A_{10-x}(MO_4)_6O_{2-\delta}$ where M=Si or Ge, and A corresponds to rare earth and alkaline earth cations (e.g., $Ln_{10}Si_6O_{27}$ where Ln=La, Pr, Nd, Sm, Gd, or Dy).

In various embodiments of the invention, the electrolyte includes, consists essentially of, or consists of, for example, one or more of the following proton conducting materials: $BaCeO_3$ and $BaZrO_3$ and varieties that are 1) doped with one or more of with one or more of Y, Sc, Nd, Gd, Yb, etc. (e.g., $Ba_xCe_{0.9}Y_{0.1}O_{3-\delta}$ (BCY), $BaZr_{0.8}Y_{0.2}O_{3-\delta}$ (BZY) or $BaCe_{0.7}Zr_{0.1}Y_{0.2}O_{3-\delta}$ (BCZY)); 2) doped with one or more of Y, Sc, Nd, Gd, and Yb and one of F, Cl, or Br halogens (e.g., 5 mol % F-doped $BaCe_{0.90}Gd_{0.1}O_{3-\delta}$, or BCGF; and 5-mol % Cl doped $BaCe_{0.90}Gd_{0.1}O_{3-\delta}$, or BCGCl); 3) doped with one or more of transition metals such as Y, Ti, Zr, Mo, Fe, or Co and post-transition metals such as Ga, In, or Sn (e.g., $BaCo_{0.4}Fe_{0.4}Zr_{0.2}O_{3-\delta}$ (BCFZ), $BaCo_{0.4}Fe_{0.4}Zr_{0.1}Y_{0.1}O_{3-\delta}$ (BCFZY)); or 4) co-doped with donor dopants such as Nb or Ta (e.g., $Ba_{1-x}Nd_xCe_{1-y}Nd_yO_{3-(y-x)/2}$).

In various embodiments of the invention, the solid electrolyte includes, consists essentially of, or consists of, for example, various doped ceria materials such as samarium doped ceria (SDC, e.g., $Ce_{3.8}Sm_{0.2}O_{1.9}$) or gadolinium doped ceria (GDC, e.g., $Ce_{0.9}Gd_{0.1}O_{1.95}$). Such solid electrolytes may have dopant concentrations ranging from, for example, approximately 5 to approximately 30 mol %, or from approximately 10 to approximately 20 mol %. In various embodiments, the solid electrolyte may include, consist essentially of, or consist of one or more doped cerias such as yttria-doped ceria (YDC, e.g., $Y_{0.1}Ce_{0.9}O_{1.95}$), neodymium-doped ceria (NdDC, e.g., $Nd_{0.1}Ce_{0.9}O_{1.95}$), praseodymium-doped ceria (PrDC, e.g., $Pr_{0.1}Ce_{0.9}O_{1.95}$), and/or lanthanum-doped ceria (LaDC, e.g., $La_{0.1}Ce_{0.9}O_{1.95}$). Such solid electrolytes may have dopant concentrations ranging from, for example, approximately 5 to approximately 30 mol %, or from approximately 10 to approximately 20 mol %.

The cathode may include, consist essentially of, or consist of a composite material of one or more cathode materials and one or more electrolyte materials. For example, the cathode may include, consist essentially of, or consist of a mixture of LSCF and GDC or SSC and GDC, e.g., in a ratio of approximately 3:7 to approximately 7:3 by mass. The cathode composite material may be both an ionic conductor and an electronic conductor, and the cathode may be porous to promote oxygen access for ionization and to provide electrochemically active triple phase boundaries (TPBs) where the electrolyte, air, and cathode meet. For example, the cathode may have a porosity ranging from approximately 30% to approximately 60%, or from approximately 35% to approximately 55%, or even from approximately 40% to approximately 30%. In various embodiments, the thickness of the cathode may be approximately 0.5 µm to approximately 500 µm, or approximately 5 µm to approximately 250 µm, or even approximately 10 µm to approximately 100 µm.

Between the cathode layer and the electrolyte there may reside a cathode functional layer (CFL). The CFL may act to reduce the interfacial resistances between the cathode layer and electrolyte and/or to prevent undesirable reactions between the cathode layer and electrolyte that may occur during SOFC fabrication or operation. Such CFLs are generally fairly thin and may be approximately 1 nm to approximately 20 µm thick. The thickness of the CFL may also be between approximately 500 nm and approximately 10 µm or even between approximately 1 and approximately 5 µm. A CFL may include, consist essentially of, or consist of any combination of the materials described herein for the cathode (e.g, LSCF) and/or electrolyte layers (e.g., GDC), or less complex compounds featuring elements within such materials (e.g., cobalt or cobalt oxide). A CFL may also include, consist essentially of, or consist of a single cathode layer or electrolyte material.

Like the cathode, the anode may be a composite material, and is preferably a porous, ionic and electronic (i.e., electrons and/or holes) conductor in order to promote the electrochemical reaction. In various embodiments of the invention, the anode includes, consists essentially of, or consists of a single phase or a composite material as a mixture, e.g., in a ratio of approximately 3:7 to approximately 7:3 by mass for a two-phase composite. In various embodiments, any phase or all phases of anode may include, consist essentially of, or consist of, a MIEC material. In various embodiments, any phase or all phases of anode may include, consist essentially of, or consist of, a pure electronic conductor or ionic conductor. In various embodiments of the invention, the anode is a composite that includes, consists essentially of, or consists of cermet material. In various embodiments of the invention, the anode is a cermet that includes, consists essentially of, or consists of, for example, various transition metals (e.g., Ni, Cu, Ti, Co, Mn, V, Mo, Nb, W, and/or Fe) mixed together as a composite with one or more solid electrolyte materials. For example, the ceramic component of the composite cermet anode may include, consist essentially of, or consist of yttria stabilized zirconia (YSZ). The YSZ in the composite cermet anode may have dopant concentrations ranging from, for example, approximately 2 to approximately 20 mol %, or from approximately 3 to approximately 12 mol %. In various embodiments, the YSZ includes 8 mol % Y (8YSZ, e.g., $(ZrO_2)_{0.92}(Y_2O_3)_{0.08}$) and/or 3 mol % Y (3YSZ, e.g., $(ZrO_2)_{0.97}(Y_2O_3)_{0.03}$). In various embodiments of the invention, the anode includes, consists essentially of, or consists of, for example, a composite of Ni and YSZ (Ni-YSZ) or a composite of Cu and YSZ (Cu-YSZ). In various other embodiments of the invention, the ceramic component of a composite cermet anode includes, consists essentially of, or consists of, for example, GDC. In various embodiments of the invention, the anode includes, consists essentially of, or consists of, for example, a composite of Ni and GDC (Ni-GDC) or a composite of Cu and GDC (Cu-GDC). Transition metal components in an anode cermet may exist as a ceramic (e.g., an oxide such as NiO) in an as-fabricated SOFC cell but transform into a metallic phase (e.g., Ni metal) in a reducing environment (e.g., a gas environment containing hydrogen gas).

In various embodiments of the invention, all or a portion of the anode includes, consists essentially of, or consists of, for example, one or more of the following electronically conductive or MIEC ceramic materials: titanate-based oxides such as lanthanum strontium titanates (LST, e.g., $La_{0.4}Sr_{0.6}TiO_3$), Fe-doped calcium titanates (e.g., $CaFe_xTi_{1-x}O_{3-\delta}$), titania-doped YSZ, Sc- and Y-doped titanium zirconate (e.g., $Sc_{0.15}Y_{0.05}Zr_{0.62}Ti_{0.18}O_{1.9}$); lanthanum chromites (e.g., $(La,Sr)CrO_3$) and $(LaA)(CrB)O_3$ system (A=Ca, Sr and B=Mg, Mn, Fe, Co, Ni); ceramic oxides including ceramic oxide materials containing strontium, iron, cobalt, and molybdenum (i.e., SFCM, e.g., $SrFe_{0.1}Co_{0.45}Mo_{0.45}O_3$, $SrFe_{0.2}Co_{0.4}Mo_{0.4}O_3$, $SrFe_{3.34}Co_{0.33}Mo_{0.33}O_3$, or $SrFe_{3.5}Co_{0.25}Mo_{0.25}O_3$), $SrFeCo_3O_x$, $SrCo_{0.8}Fe_{0.2}O_3$, and $La_{3.6}Sr_{0.4}Fe_{0.8}Co_{0.2}O_3$ (LSCF). In various embodiments of the invention, the electronically conductive or MIEC ceramic materials are mixed with one or more solid electrolyte materials as a composite anode.

All or a portion of the anode may include, consist essentially of, or consist of a mixture of SFCM and another material such as ceria or GDC. For example, as shown in FIG. 1, the anode may be composed of an anode support and an anode functional layer. The anode support, which supports the cell and allows gas (i.e., fuel) access to the functional layer, may include, consist essentially of, or consist of, e.g., a mixture of SFCM and ceria. The anode functional layer, which promotes electrocatalytic activity in the anode, may include, consist essentially of, or consist of, e.g., a mixture of SFCM and GDC. In various embodiments, the anode is free of nickel, nickel oxide, and/or yttria. In accordance with embodiments of the invention, the anode and/or portions thereof (e.g., anode support and/or anode functional layer) may be "all-ceramic," i.e., free of nickel, nickel oxide, and other metals not incorporated within a ceramic-phase network. Such materials may exhibit superior performance and reliability during load following, thermal cycling, and redox cycling.

In various embodiments of the invention, the anode is further modified with the addition of one or more alkaline- and rare-earth materials (e.g., MgO, CaO, SrO and $CeO_2$) as an additional phase within the cermet or ceramic material. Other materials may "decorate" the surface of the anode and may be deposited via various techniques, such as an infiltrate solution (e.g., nickel or cerium nitrate) followed by calcination. Other deposition methods of the surface "decorating" materials include wash coating (e.g., a colloidal solution) and chemical vapor deposition (CVD). The addition of such materials to the surface of the anode (including the surface of pores and interfaces within the anode) may enhance ionic and/or electronic conductivity, may enhance catalytic and/or electrocatalytic activity, and/or may suppress undesirable reactions such as sulfur poisoning or coking in the presence of certain fuel compositions (e.g., natural gas). Additional infiltrate materials for anode include, consist essentially of, or consist of, for example, platinum group metals (e.g., Pt or Ru) and/or constituents from any of the other possible combinations of materials of the anode (e.g., Ni, Ce, Gd, Cu, Mg, Co, Pr, etc.).

In various embodiments of the invention, the anode may include, consist essentially of, or consist of an anode support (or anode support layer) and an anode functional layer (AFL). The AFL may include, consist essentially of, or consist of finer particles than in the ASL, thereby providing a higher number of triple phase boundaries and subsequent higher electrochemical activity. The AFL may act to reduce the interfacial resistances between the anode and electrolyte and/or to prevent undesirable reactions between the anode support layer and electrolyte that may occur during SOFC fabrication or operation. Such AFLs are generally fairly thin and in various embodiments AFL may be approximately 1 nm to approximately 20 µm thick. In various embodiments, the thickness of AFL may be between approximately 500 nm and approximately 10 µm or even between approximately 1 and approximately 5 µm. An AFL may include, consist essentially of, or consist of any combination of the materials of the anode and/or electrolyte layers (e.g., Ni-GDC), or less complex compounds featuring elements within such materials (e.g., cobalt or cobalt oxide). The thickness of an anode support layer (ASL) may be approximately 100 µm to approximately 2,000 µm thick, or approximately 150 µm to approximately 1,000 µm, or approximately 200 µm to approximately 800 µm, or even approximately 350 µm to approximately 700 µm thick.

In various embodiments, the cell is electrolyte supported. The electrolyte is the thickest part of an electrolyte-supported cell. The anode and cathode are much thinner than the electrolyte in a cell that is electrolyte supported. While such cells tend to be stronger because the dense electrolyte is the thickest part of the cell, among other advantages, they tend to have greater ohmic losses and therefore the tradeoff is lower performance compared to electrode-supported (e.g., anode-supported) cells. For a cell that is electrolyte-supported, the thickness of an electrolyte support layer may be approximately 75 µm to approximately 750 µm thick, or approximately 125 µm to approximately 500 µm, or even approximately 200 µm to approximately 350 µm thick. The electrolyte support layer in an electrolyte-supported cell may be thinner than an anode support layer in an anode-supported cell, e.g., due to the high density of typical electrolytes, whereas anodes are porous. For an electrolyte-supported cell, the anode may have a thickness of approximately 5 µm to approximately 200 µm, or approximately 10 µm to approximately 100 µm, or even approximately 15 µm to approximately 50 µm. The cathode for an electrolyte-supported cell may have a thickness of approximately 0.5 µm to approximately 500 µm thick, or approximately 5 µm to approximately 250 µm, or even approximately 10 µm to approximately 100 µm thick.

In various embodiments, the cell is cathode supported. The cathode is the thickest part of a cathode-supported cell. The anode and electrolyte are much thinner than the cathode in a cell that is cathode-supported. While cathode-supported cells have been shown to have long lifetimes with low degradation, the tradeoff is that they tend to be more difficult to manufacture than electrolyte-supported cells or anode-supported cells, and they tend to have lower performance than anode-supported cells. For a cell that is cathode-supported, the thickness of a cathode support layer may be approximately 125 µm to approximately 1,000 µm thick, or approximately 250 µm to approximately 800 µm, or even approximately 400 µm to approximately 600 µm thick. For a cathode-supported cell, the anode may have a thickness of approximately 5 µm to approximately 200 µm, or approximately 10 µm to approximately 100 µm, or even approximately 15 µm to approximately 50 µm. For a cathode-supported cell, the electrolyte may have a thickness that ranges from, for example, approximately 500 nm to approximately 40 µm, or 1 µm to approximately 40 µm, or 5 µm to approximately 30 µm, or even from approximately 10 µm to approximately 30 µm.

In various embodiments, the cell is metal supported or even ceramic supported. For instance, a metal-supported cell may include, consist essentially of, or consist of a metal support (e.g., a porous stainless steel such as 441 stainless steel) on which a thinner anode material (e.g., a cermet such as Ni-YSZ), electrolyte, and cathode are disposed. The thinner layers in such cells are often deposited using thin-film deposition techniques (e.g., sputtering or thermal/plasma spray techniques) to avoid undesirable reactions between the support and the other layers at high temperatures. A ceramic-supported cell may include a porous ceramic support (e.g., a YSZ or GDC scaffold), on which a thinner anode material (e.g., a cermet such as Ni-YSZ), electrolyte, and cathode are disposed. While supporting the cell, the porous ceramic support does not function as an anode. The porous ceramic support may be an electronically-conductive ceramic, or electronic conductivity may be introduced through infiltration of a conductive material (e.g., nickel) that coats all or a portion of the scaffold. In various embodiments, an interconnect is used as the cell support, such that a separate interconnect is not needed in the SOFC stack. In various embodiments, a porous metal-supported cell or ceramic-supported cell is joined to an interconnect (e.g., using brazing or welding). In various embodiments, the metal, ceramic, or interconnect support may have a thickness of approximately 100 µm to approximately 5,000 µm, or approximately 150 µm to approximately 1,000 µm, or even approximately 200 µm to approximately 500 µm.

The slurry should have uniform distribution of components, shear thinning behavior for casting purpose, and good wettability with a substrate on to which the slurry will be coated. This is achieved through the addition of various binders, plasticizers, and dispersing agents to the slurry in addition to the ceramic and/or metal components (e.g., powders also added to the slurry) or pore former components (e.g., starch, polymethyl methacrylate or PMMA, etc.) of a particular SOFC layer. Dispersing agents are also known as surfactants or deflocculants. Slurry binders may include vinyl-based (e.g., polyvinyl butyral), acrylic-based (e.g., polyethyl methacrylate), cellulose-based (e.g., cellulose acetate), and aqueous-based (e.g., polyvinyl alcohol) chemicals. Slurry plasticizers may include glycols (e.g., polyethylene glycol) or phthalates (e.g., n-butyl benzyl phthalate). Slurry dispersants may include blown menhaden fish oil, stearic acid, citric acid, phosphate ester, and various amines (e.g., polyoxyalkalene amine).

The cathode design and material can vary. The cathode component of a SOFC functions as the site for electrochemical reduction of oxygen. It must have high electronic conductivity, electrochemical stability, high catalytic activity for oxygen reduction, matched thermal expansion coefficient with electrolyte and interconnect materials, and low cost. Typical cathode materials are perovskite-type oxide with a general formula $ABO_3$ where A are cations such as La, Sr, Ca, and Pb which are larger and coordinated to twelve oxygen anions, while the B are cations such as Ti, Cr, Ni, Fe, Co, and Zr which are smaller and coordinated to six oxygen anions. For an anode-supported SOFC, the cathode is usually coated onto an already sintered anode-electrolyte assembly through a coating technique such as screen printing followed by a sintering step that is appropriate for an SOFC. The cathode may alternatively be co-sintered with the anode and electrolyte.

At least one of the first, second and third SOFC layer compositions can comprise a binder. A binder is an important component in fabricating the SOFC component. During green tape fabrication, the binder provides appropriate rheological properties to slurries for green tape fabrication and cohesion to components for good mechanical integrity. The binder is usually burned out during the subsequent sintering process. Along with other components, such as pore formers, the binder can affect the sintering conditions to reach desirable properties such as porosity, shrinkage rate, thermal expansion coefficient. The binder can be at least one selected from the group consisting of polyvinyl butyral (PVB) and polyvinyl alcohol (PVA). Other binders are possible.

There is shown in FIGS. 1-8 a method and a system for making laminated green cells for use in making SOFCs. Other configurations and embodiments are possible. The green cell 10 is comprised of several layers which can vary, but for an anode-supported SOFC typically include an anode support layer (ASL) 78, and anode functional layer (AFL) 118, and an electrolyte layer 172. The green cell 10 may also be known as a "half-cell" because the full SOFC will also have a cathode in addition to the anode and electrolyte. In practice, the ASL can be made up of several laminated layers as indicated by supplemental ASL 88, which can represent n≥2 additional layers.

Figure 2:
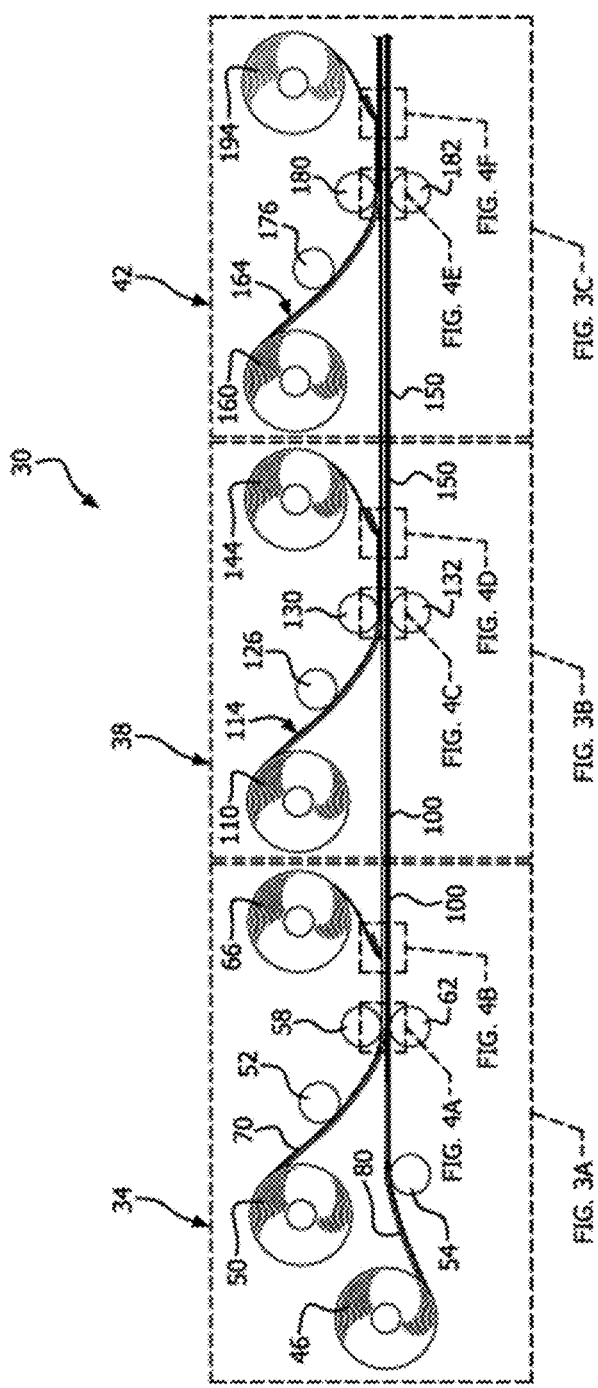
FIG. 2 is a schematic illustration of a process for making a SOFC green cell according to the invention.

There is shown in FIG. 2 a system 30 that includes lamination sections configured in a roll-to-roll assembly line. The invention can be used with any number of lamination sections. In the embodiment shown in FIG. 2, the system 30 includes and ASL-ASL lamination section 34, an ASL-AFL lamination section 38, and a AFL-electrolyte lamination section 42.

Figure 3A:
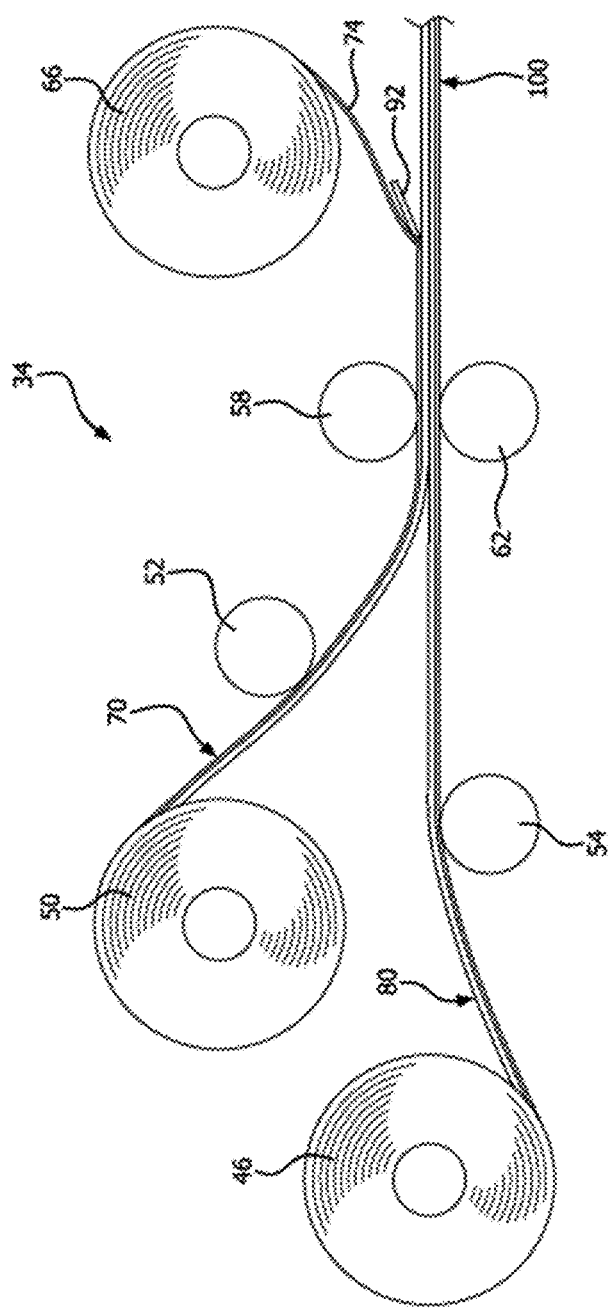
FIG. 3A is an enlargement of area FIG. 3A in FIG. 2.

The ASL-ASL lamination section 34 is shown in greater detail in FIG. 3A and FIGS. 4 A-B. A roll 50 or other storage can be provided for a first ASL laminate tape 70 having a flexible carrier film 74 and a first ASL composition 78 joined to the flexible carrier film 74. A roll 46 or other storage can be provided for a second ASL laminate tape 80 having a flexible carrier film 84 and a second ASL composition 88 joined to the flexible carrier film 84. Rollers 52 and 54 can guide the first and second ASL laminate tapes to calenders 58 and 62. The flexible carrier film 74 and flexible carrier film 84 face outward. As shown in FIG. 4A, the calenders 58 and 62 press the ASL composition 78 and second ASL composition 88 together. As the tape moves in the direction shown by arrow 90, the thickness of the joined ASL layers is reduced from thickness AA-AA to thickness BB-BB.

One of the flexible carrier film layer 74 and flexible carrier film layer 84 must be removed in order to laminate another SOFC laminate tape. This can be performed by any suitable process. As shown in FIG. 4 B, a scraper blade 92 can be positioned so as to scrape and remove the flexible carrier film layer 74. The removed tape 74 accumulates on roller 66. It is also possible to peel the flexible carrier film 74 onto the roller 66 where weak adhesion between the flexible carrier film 74 and the adjacent first ASL composition 78 permits. The SOFC precursor laminate 100 is thereby produced.

Figure 4A:
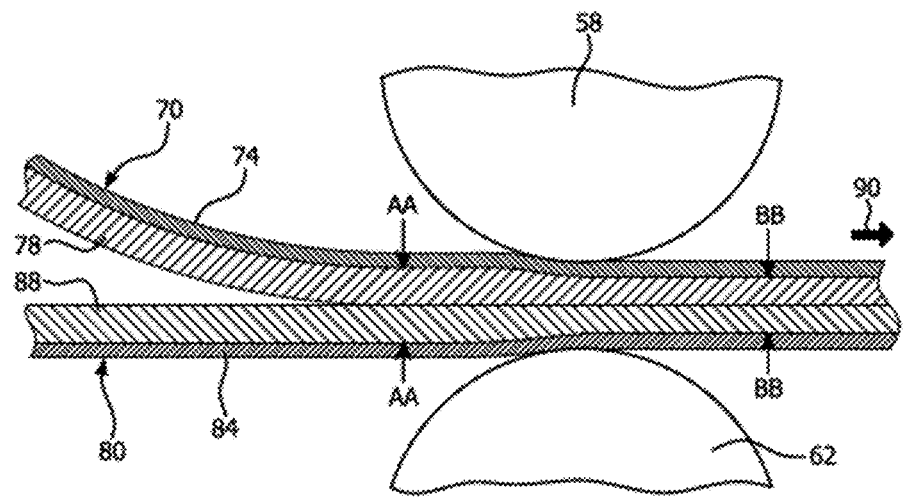
FIG. 4 is an enlargement of area FIG. 4A in FIG. 2.
FIG. 4B is an enlargement of area FIG. 4B in FIG. 2.
FIG. 4C is an enlargement of area FIG. 4C in FIG. 2.
FIG. 4D is an enlargement of area FIG. 4D in FIG. 2.
FIG. 4E is an enlargement of area FIG. 4E in FIG. 2.
FIG. 4F is an enlargement of area FIG. 4F in FIG. 2.
Figure 4B:
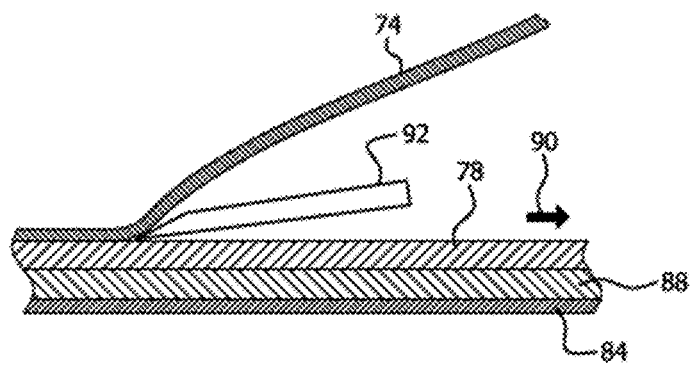
Figure 4C:
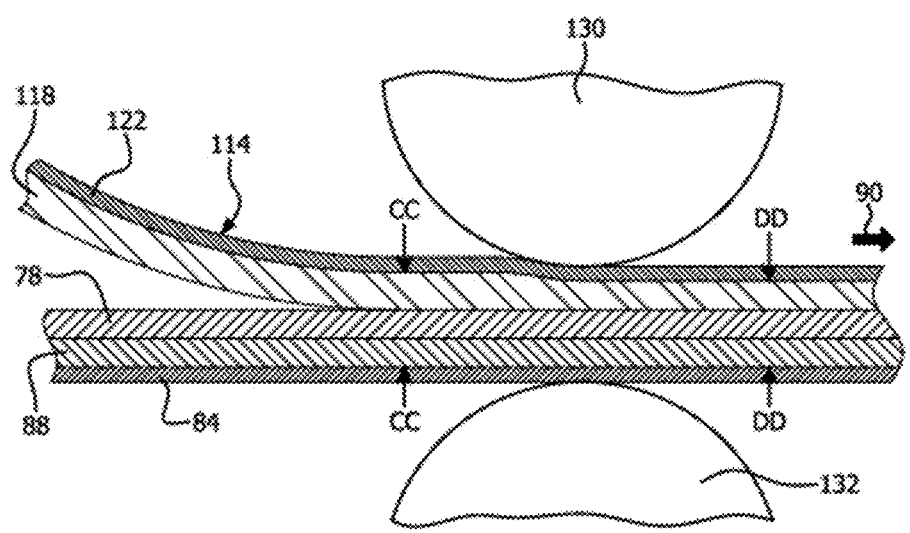
Figure 4D:
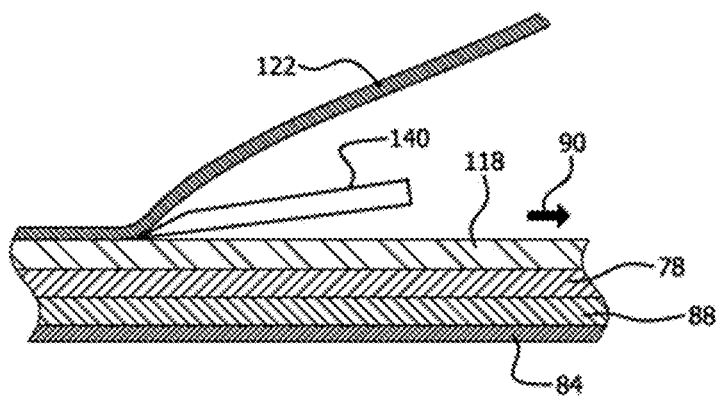
Figure 4E:
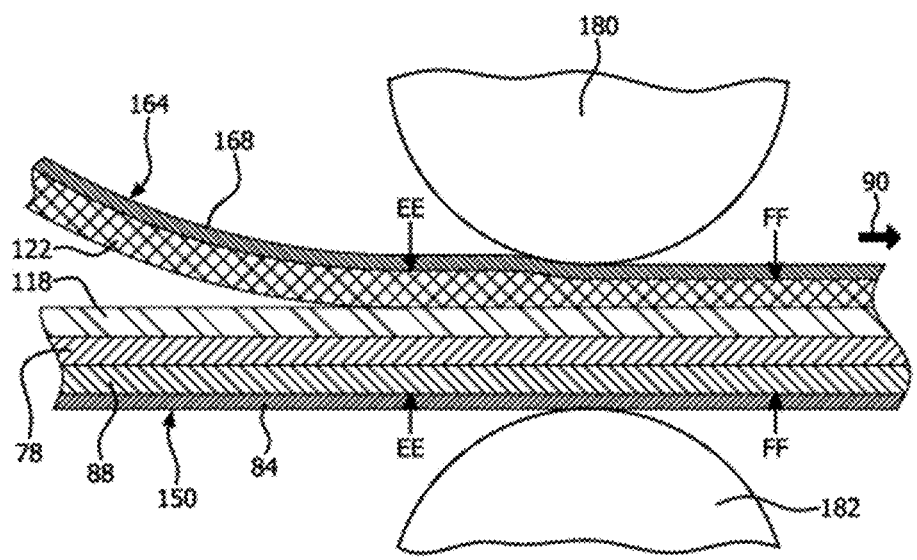
Figure 4F:
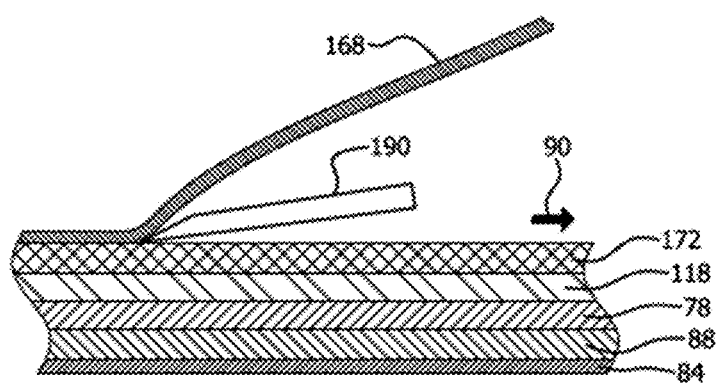

The SOFC precursor laminate 100 then enters the ASL-AFL lamination zone 38. As shown in FIG. 3 B and FIGS. 4 C-D, an AFL laminate tape 114 can be provided on a roll 110. The AFL laminate tape 114 has a flexible carrier film 122 and an AFL composition 118 adhered thereto. The AFL laminate tape 114 is guided by suitable structure such as roller 126 to a position adjacent the SOFC precursor laminate 100, with the AFL composition 118 adjacent to the ASL composition 78 of the SOFC precursor laminate 100. The AFL laminate tape 114 and SOFC precursor laminate 100 pass through calenders 130 and 132 in the direction shown by arrow 90. In the process of passing through the calenders 130 and 132, the thickness of the combined SOFC layers —, the first ASL composition 78, the second ASL composition 88, and the AFL composition 118, is reduced from thickness CC-CC to thickness DD-DD. One of the flexible carrier film layers 122 and 84 can be removed by suitable structures such as scraper blade 140 as shown in FIG. 4D. The collected flexible carrier film can be accumulated in a roll 144. The anode precursor laminate 150 exits the ASL-AFL lamination zone 38.

The anode precursor laminate 150 then enters the electrolyte-anode precursor laminate lamination zone 42, as shown in FIG. 3 C and FIGS. 4 E-F. The electrolyte layer laminate tape 164 can be provided on a roll or other suitable structure 160. The electrolyte layer laminate tape 164 includes a flexible carrier film 168 and an electrolyte layer composition 172 adhered to the flexible carrier film 168. The electrolyte layer laminate tape 164 can be guided by suitable structures such as roller 176 to calenders 180 and 182. The calenders 180 and 182 reduce the thickness of the composite SOFC precursor laminate from the thickness EE-EE to thickness FF-FF as shown in FIG. 4E as the tape moved in the direction shown by arrow 90. The flexible carrier film layer 168 can be removed as by scraper blade 190 and collected on a roll 194 as shown in FIG. 4 F.

It should be appreciated that the above order of application of the SOFC the layers can be varied significantly. For example, it is possible to begin with the electrolyte layer and add the AFL layer and subsequently the ASL layer. Other orders of lamination are possible. For example, when AFL or electrolyte tapes are below a critical thickness (e.g., ≤20 microns), removing the carrier film from a thin tape is very difficult and should be done only after the AFL is laminated. In other words, a thin AFL is preferably not laminated to a thin electrolyte layer because when attempting to remove the carrier film it can rip the thin tapes. However, with a proper release coating on the carrier film or dependent upon the release properties of the tape this may not be as critical.

Figure 5:
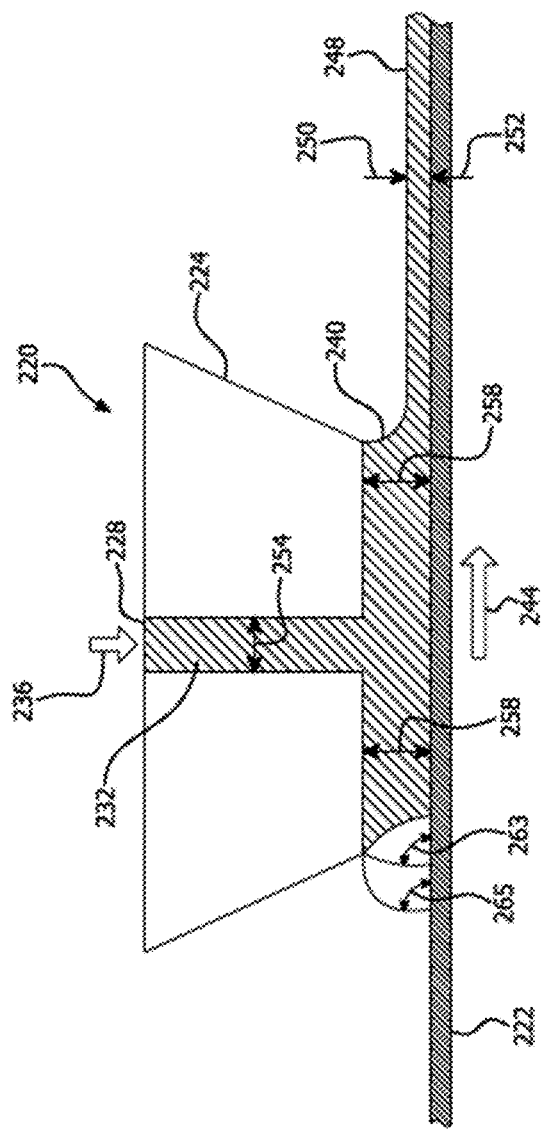
FIG. 5 is a schematic diagram of a slot die coating assembly and process.

The SOFC layer compositions can be applied to the flexible carrier film by any suitable process. There is shown in FIG. 5 a slot die coating process in which the SOFC layer composition is applied by a slot die coater 220 having a die body 224. The SOFC layer composition slurry 232 is supplied to slot 228 as shown by arrow 236. The slot 228 has a thickness 254 and deposits a portion 240 of the slurry composition 232 to the flexible carrier film surface 222. The distance between the die body 224 and the flexible carrier film 222 allows for a gap 258 for the accumulation of the portion 240 of the slurry composition 232. As the flexible carrier film 222 moves in the direction shown by arrow 244 a coating 248 is deposited having a thickness shown by arrow 250-252.

Figure 6:
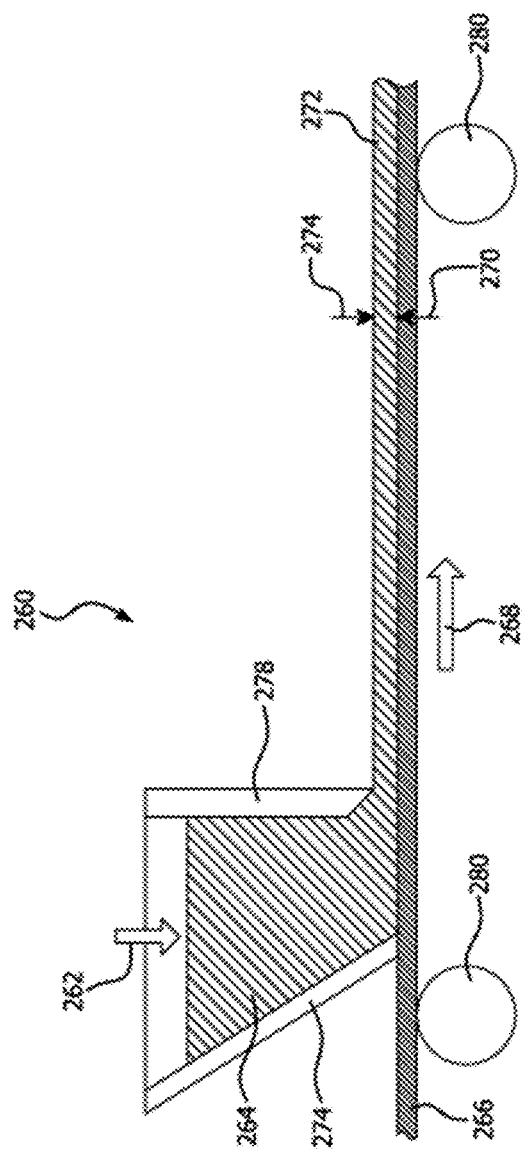
FIG. 6 is a schematic diagram of a tape casting assembly and process.

The SOFC layer composition can be applied to the flexible carrier film by other processes. A tape casting process and apparatus 260 is shown in FIG. 6. In this process the SOFC layer composition 264 is supplied in the direction of arrow 262 to a reservoir 274. A doctor blade 278 leaves a gap between the flexible carrier film 266 and the doctor blade 278, such that upon movement of the flexible carrier film 266 in the direction shown by arrow 268 a layer of SOFC slurry composition 272 is deposited at a thickness shown by arrows 270-274. Rollers 280 can be provided to facilitate movement of the flexible carrier film 266.

Figure 7:
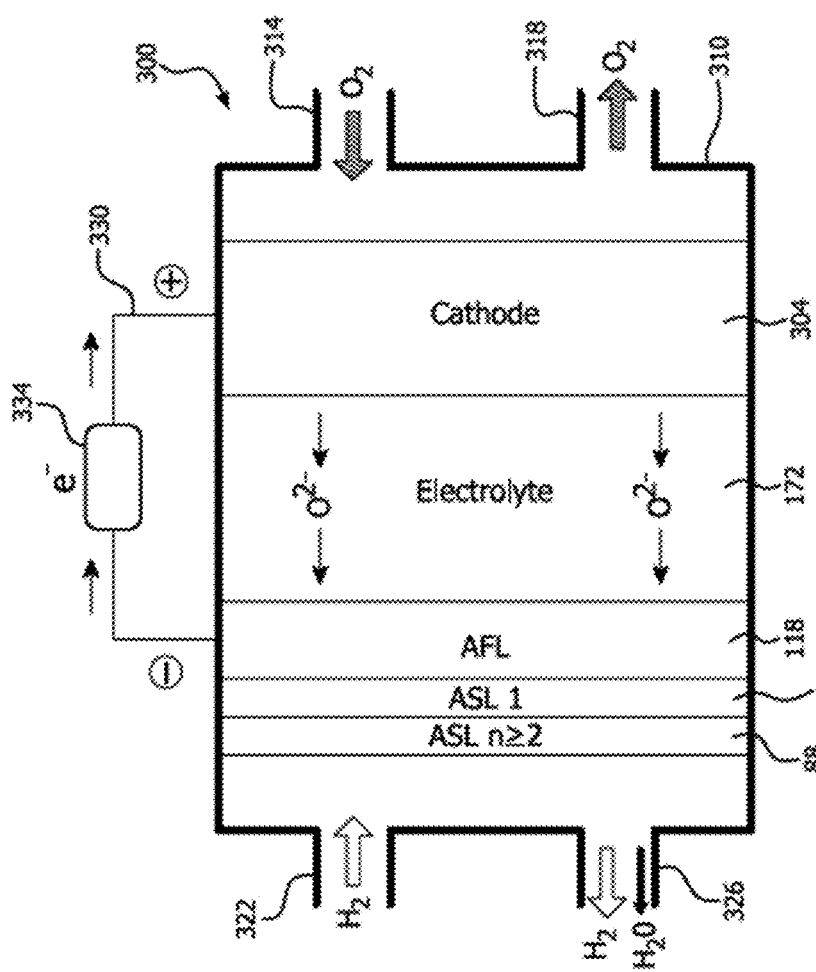
FIG. 7 is a schematic diagram of an SOFC with an $O^{2-}$ permeable electrolyte.

The composite SOFC laminate tape is then used to make SOFC 300. The SOFC 300 (also known as an SOFC stack) can have a housing 310 which contains the composite SOFC including the first ASL 78, the second (or additional) ASL 88, the AFL 118, the electrolyte layer 172, and also a cathode 304, as shown in FIG. 7. The housing 310 is also known as a stack or a series of stack repeat units, which may include, consist essentially of, or consist of the composite SOFC, a conductive interconnect, and one or more seals (or gaskets) disposed between the composite SOFC and adjoining conductive interconnects. The interconnects provide a conductive path for electrons and fluidically separate cathode and anode sides of the composite SOFC. See for example U.S. Ser. No. 16/680,699 (Stack Configurations for Solid Oxide Electrochemical Cells) and U.S. Ser. No. 16/680,701 (Solid-State Electrochemical Devices Having Coated Components) filed Nov. 12, 2019, the disclosure of which are incorporated fully by reference.

The electrolyte 172 shown in FIG. 7 is $O^{2-}$ permeable. Oxygen enters the SOFC through an inlet 314 and exits at an oxygen exit 318. Hydrogen enters through an inlet 322 and exits through a hydrogen exit 326 which can also serve as an exit for the water product of the fuel-cell reaction. In the process of the reaction, as is known electron flow is generated and passes through line 330 and load 334.

Figure 8:
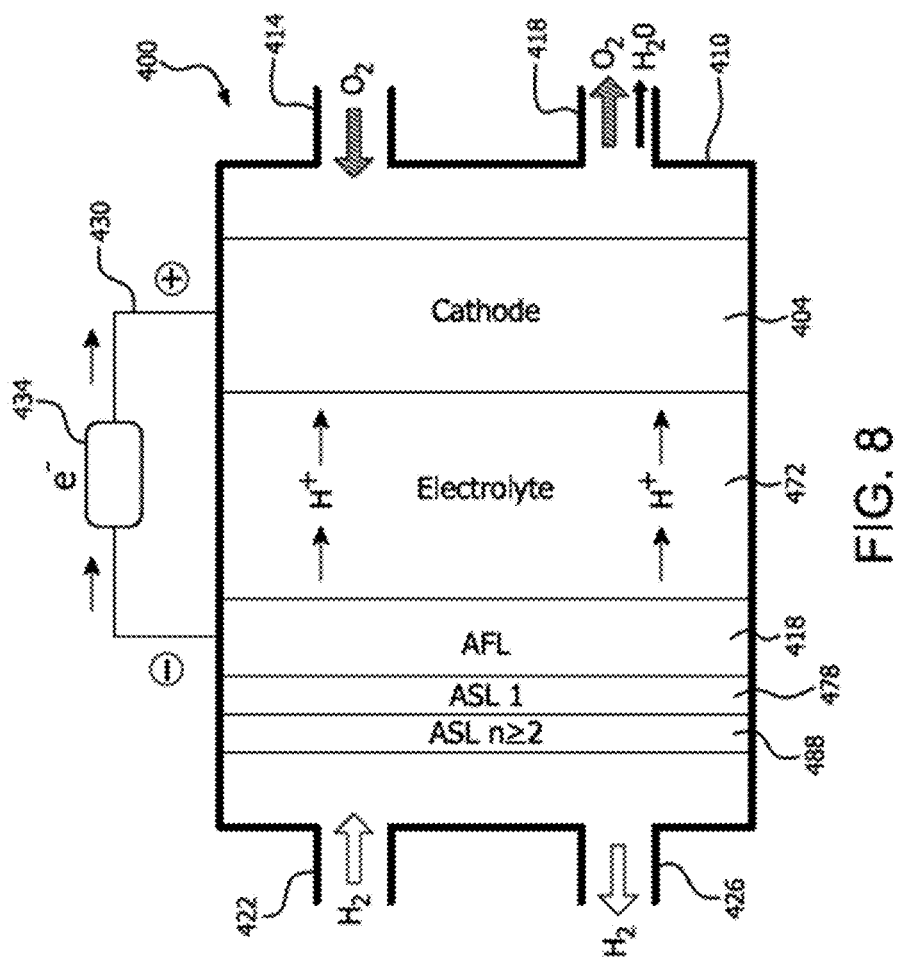
FIG. 8 is a schematic diagram of an SOFC with an $H^+$ permeable electrolyte.

The composite SOFC laminate tape can also be used to make SOFC 400 which uses a $H^+$ permeable electrolyte. The SOFC 400 can have a housing 410 which contains the composite SOFC including the first ASL 478, the second (or additional) ASL 488, the AFL 418, the electrolyte layer 472, and also a cathode 404, as shown in FIG. 8. The electrolyte 472 shown in FIG. 8 is $H^+$ permeable. Oxygen enters the SOFC through an inlet 414 and exits at an oxygen exit 418 which can also serve as the exit or the water product of the fuel-cell reaction. Hydrogen enters through an inlet 422 and exits through a hydrogen exit 426. In the process of the reaction electron flow is generated and passes through line 430 and load 434.

It is advantageous to fabricate all these layers individually using a slurry based process, e.g., tape casting or slot-die coating, followed by lamination of the layers together to form the un-fired, "green", structure in FIG. 1. After fabrication of the green laminate, it is sintered together at high temperature to bond all the layers together, sinter the individual particles, adhere all layers together and densify the electrolyte.

The calendering process presses individual layers together between rollers to adhere them together. The process involves heat and high pressure to push the layers in intimate contact and promote adhesion between the polymer binders used in each green layer. An example of the calendering process used to make the structure in FIG. 1 from feeds of green tape is shown in FIG. 2. From left to right, green tape of the two ASLs are fed to the first calender rollers and squeezed together to form one multi-layer. The green tapes are all supported on Mylar, which is removed after the first calender step from the top side, so that the next layer composed of AFL can be pressed against the ASL multilayer in calender step 2. The process continues with the final electrolyte (such as Gd-doped ceria (GDC)) layer being applied to create the final SOFC multi-layer structure. After calendering the layers together, they can be rolled up leading to the identification of this as a roll-to-roll process, or cut before or after rolling, into the squares and then sintered.

The substrate can be a sheet of Mylar, or another layer of material, such as one of the tapes above. For example, in one approach, the electrolyte layer (GDC) is deposited on a sheet of Mylar with slot-die coating, dried, and then a layer of AFL is deposited on the dried electrolyte layer, and then this multilayer is dried. This multilayer can then be fed to the calendering process to calender it to fabricate the final multilayer structure. Like the calender processes above, slot-die coating is a continuous process and can be introduced into the overall process to manufacture the green SOFC laminate in a roll-to-roll fashion.

Figure 9A:
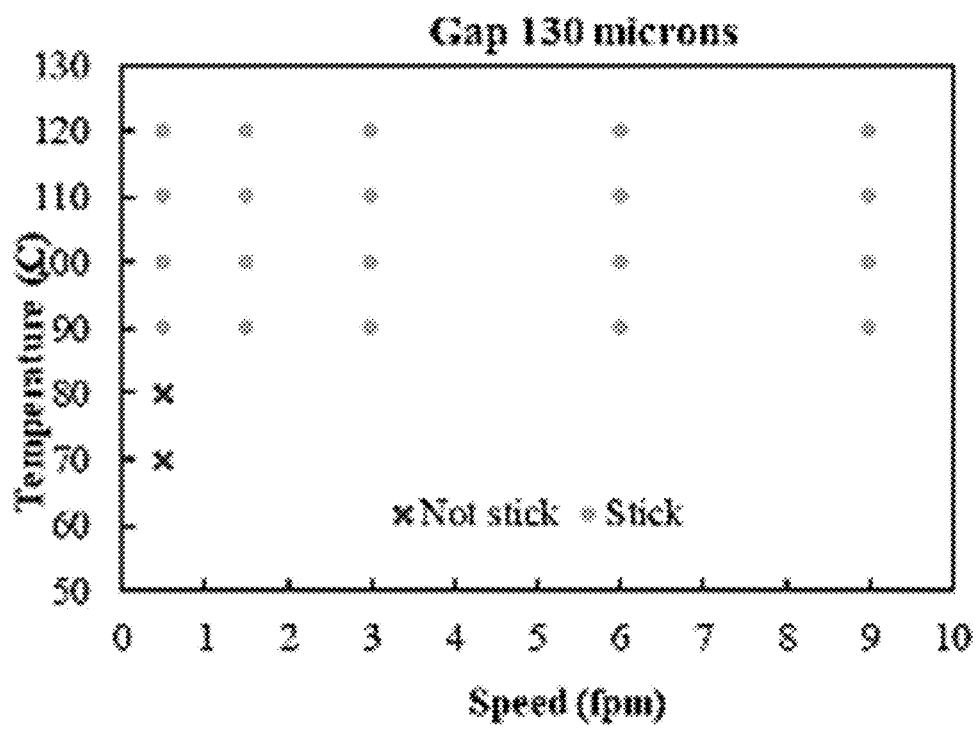
FIG. 9A is a plot of roller temperature (° C.) vs speed (fpm) showing adhesion of electrolyte-electrolyte green tape layers for a calender gap of 130 microns.
Figure 9B:
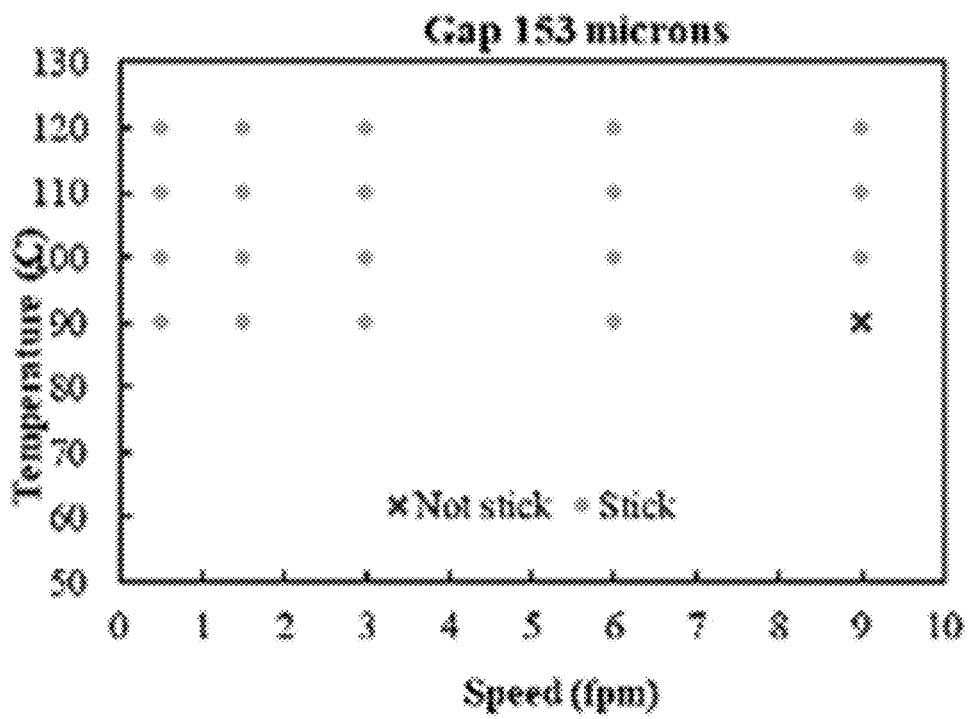
FIG. 9B is a plot of roller temperature (° C.) vs speed (fpm) for a calender gap of 153 microns.
Figure 9C:
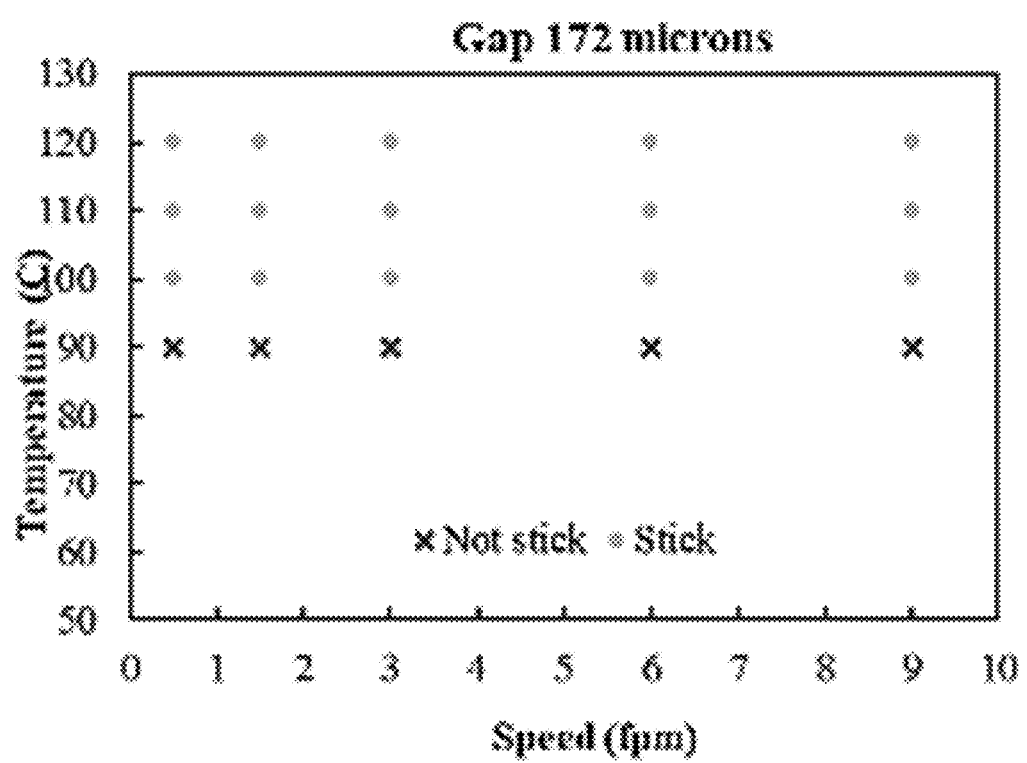
FIG. 9C is a plot of roller temperature (° C.) vs speed (fpm) for a calender gap of 172 microns.

Tape cast electrolyte (10-30 μm thickness) supported on a Mylar carrier (75 μm thickness) were calendared together at different feed rates, roller gaps, and temperatures. Since the tapes are so thin and must be supported by a carrier (for example Mylar), they are adhered top to top with air exposed portions of tape denoted as the top. An example of two layers that adhered well and an example that did not adhere well were determined. Parameters that led to good or bad adhesion are shown in FIGS. 9 A-9 C which show calendering conditions of feed rate, gap, and temperature. The adhesion was most impacted by temperature and gap size, where a large gap size of 170 μm and low temperature of 90° C. did not result in adhesion, almost irrespective of feed rate, as shown by the figure. Higher temperatures, or smaller gap size, showed good adhesion.

Figure 10A:
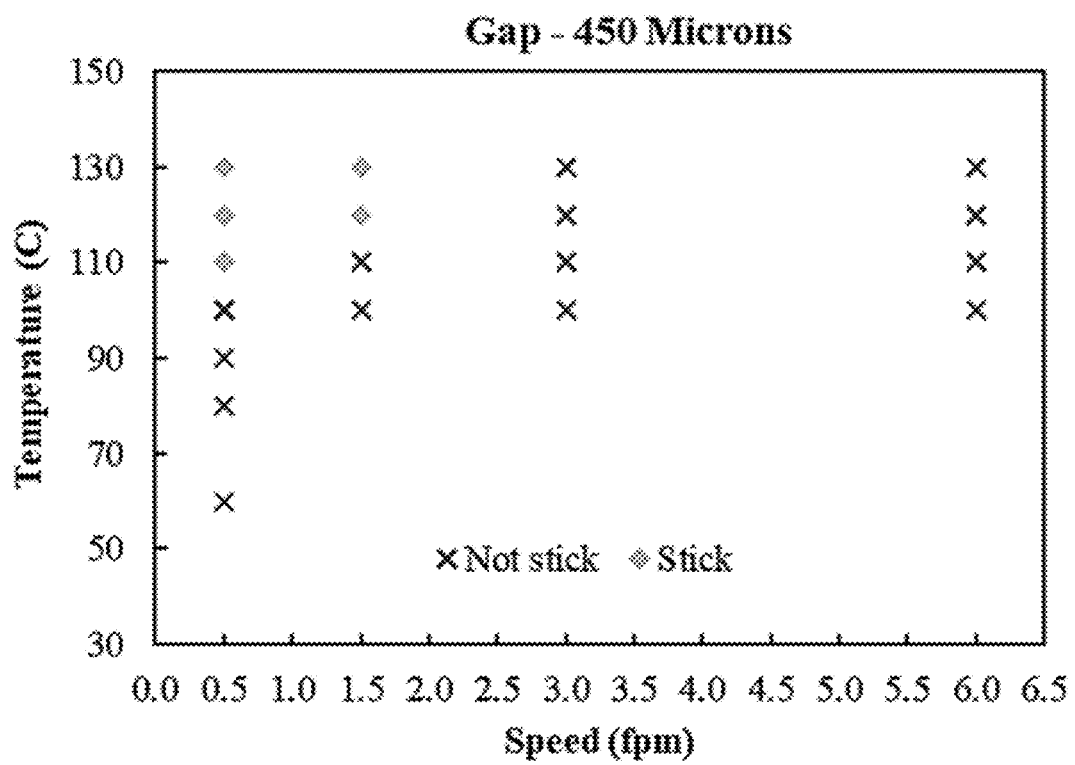
FIG. 10A is a plot of roller temperature (° C.) vs speed (fpm) showing adhesion results for ASL-ASL green tape layers for a calender gap of 450 microns.
Figure 10B:
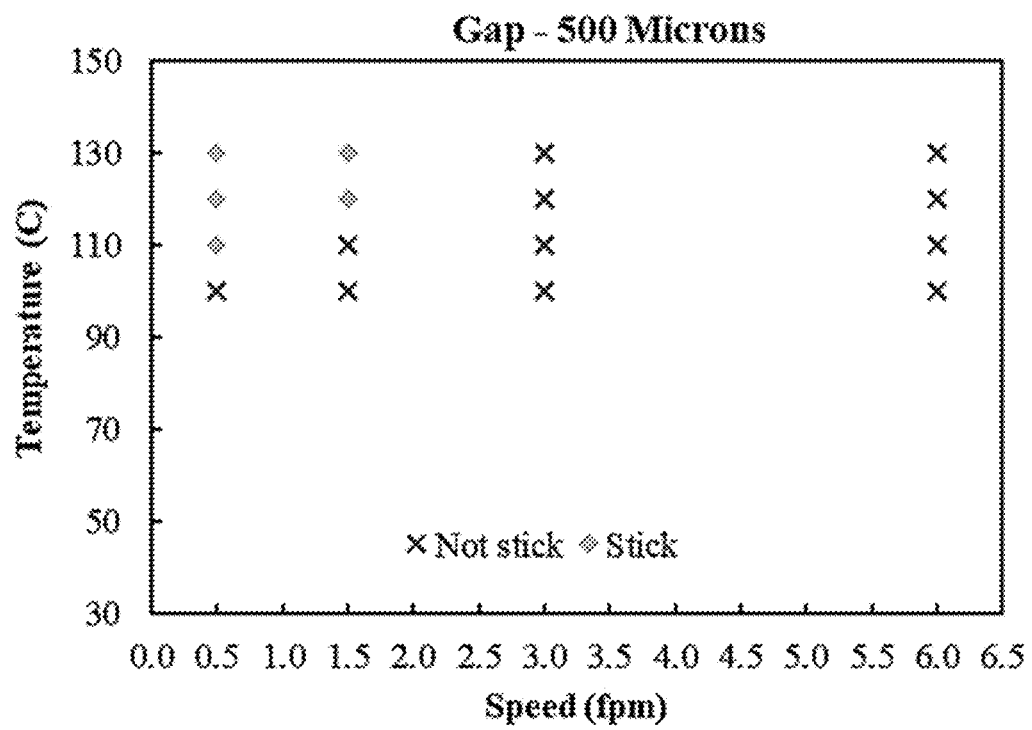
FIG. 10B is a plot of roller temperature (° C.) vs speed (fpm) for a calender gap of 500 microns.
Figure 11A:
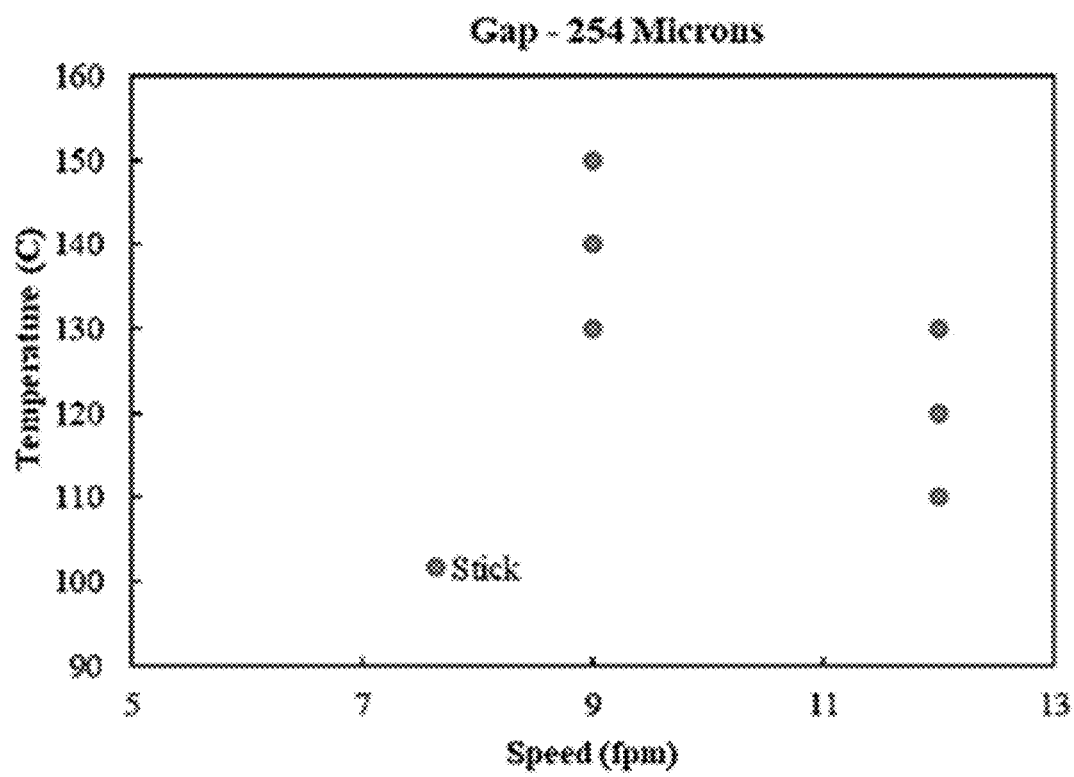
FIG. 11A is a plot of temperature (° C.) vs speed (fpm) showing adhesion of ASL-ASL green tape at higher roller temperatures for a calender gap of 254 microns.
Figure 11B:
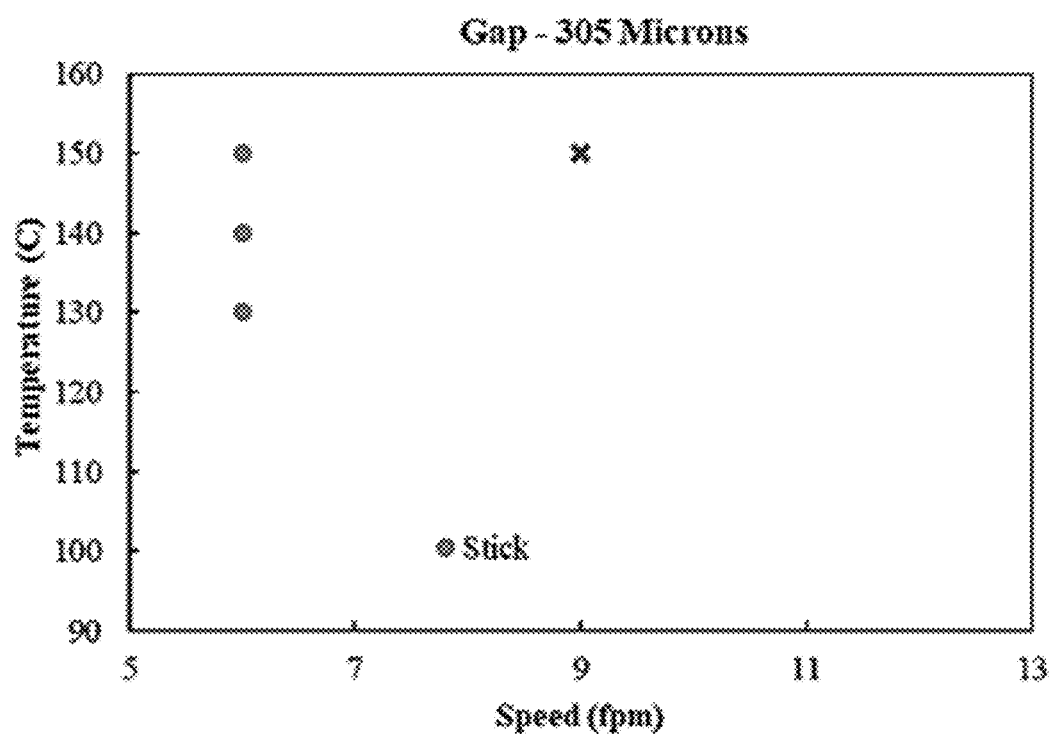
FIG. 11B is a plot of roller temperature (° C.) vs speed (fpm) for a calender gap of 305 microns.
Figure 11C:
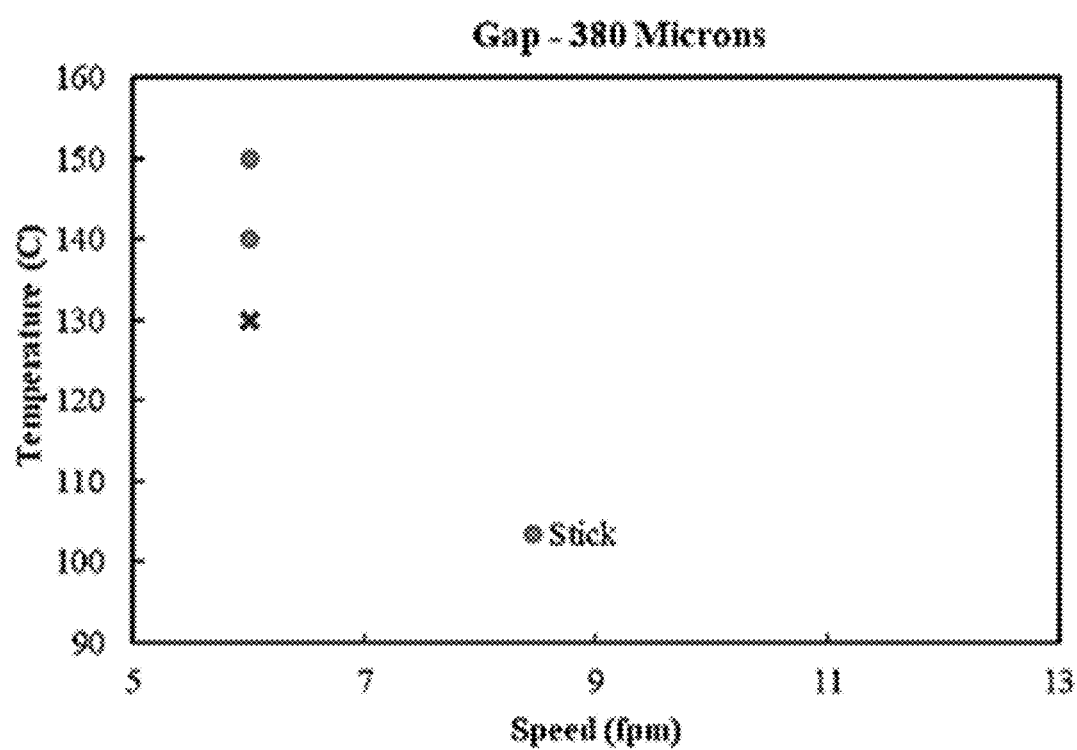
FIG. 11C is a plot of roller temperature (° C.) vs speed (fpm) for a calender gap of 380 microns.

Several two-layer ASL laminate tapes with an initial thickness of ~495 μm (together before calendering, not including two layers of Mylar each thickness of ~75 μm) were calendered top-to-bottom under different process conditions. The first trials used large gaps of 450 or 500 μm and only showed good adhesion at very low feed rates (<2 fpm) and high temperatures (>110° C.), as shown by FIGS. 10 A-10 B. Good adhesion was found for compression amounts of ~6% to the maximum of 8%, with lower values showing poor adhesion. Not shown are measurements at 550 and 600 μm which did not show good adhesion for similar temperatures and feed rates. Smaller gaps of 254, 305, and 380 μm yielded good adhesion for faster feed rates (6-12 fpm), in several cases using higher temperature, as shown by FIGS. 11 A-11 C. Not shown is data for a 450 μm gap at 150° C. and 6 fpm feed rate that exhibited poor adhesion. Compression amounts ranged from 4-8% for good adhesion under these conditions, with 3% showing poor adhesion. These results indicate that at higher temperature, better adhesion can be obtained with less amount of compression. Also, the amount of compression is reduced for faster feed rates, meaning for high throughput, the calendering operation would likely be pursued at higher temperatures and with smaller gap size.

Figure 12A:
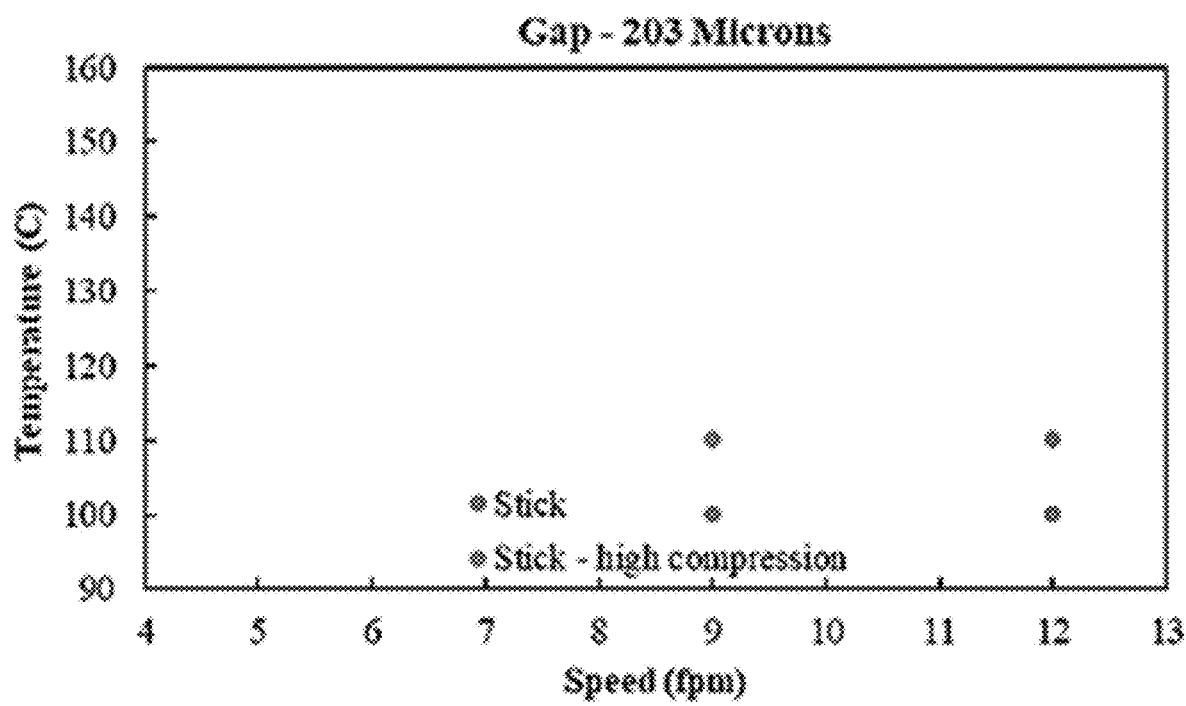
FIG. 12A is a plot of roller temperature (° C.) vs speed (fpm) showing adhesion results for ASL-AFL green tape layers for a calender gap of 203 microns.
Figure 12B:
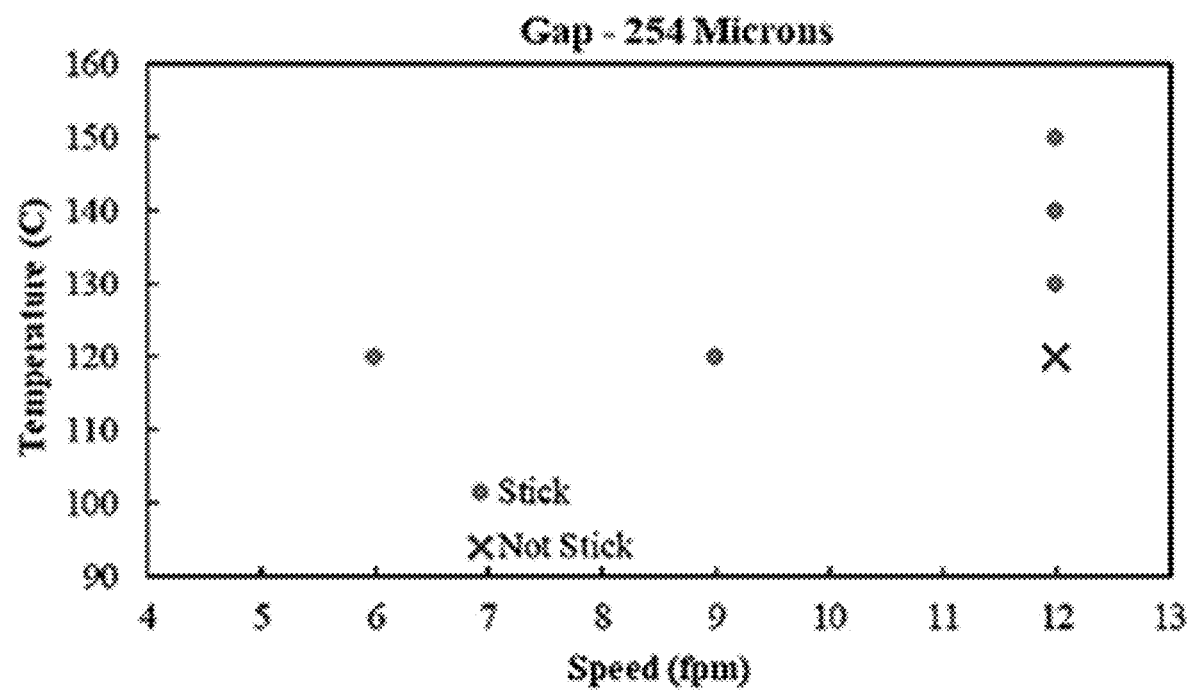
FIG. 12B is a plot of roller temperature (° C.) vs speed (fpm) for a calender gap of 254 microns.

AFL and ASL layers were calendered top-to-top. Adhesion was found to be good for all but one studied case, as shown by FIGS. 12A and 12B. Good adhesion was obtained for compression amounts of 4.5% up to the maximum of 10.4% (denoted high compression in the figure).

Figure 13:
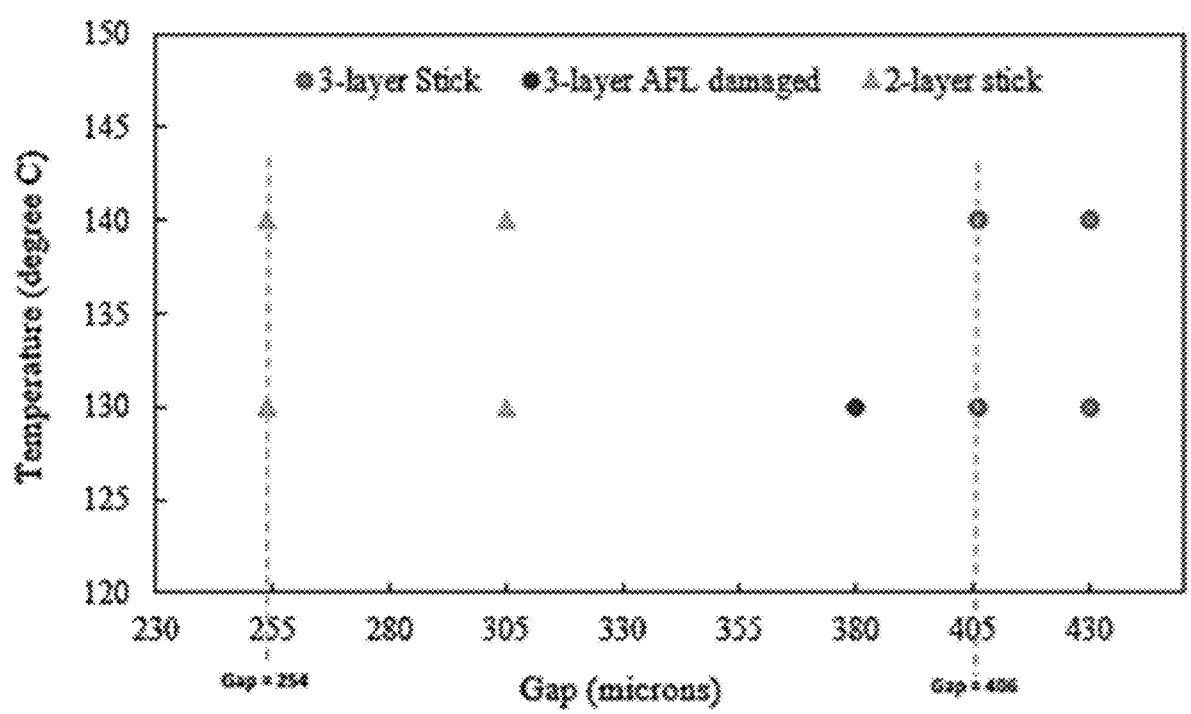
FIG. 13 is a plot of roller temperature vs. calender gap (microns) illustrating 3-layer adhesion results, 3 layer damage results, and 2 layer adhesion results.

After demonstrating the capability to laminate bi-layers of SOFC components, tri-layer samples were investigated. ASL to ASL were laminated top-to-bottom, while ASL to AFL were laminated top-to-top. In the trial of tri-layer lamination, a two-step approach using 6 fpm feed rate, 130° C. and 140° C. temperature and different gap settings was performed, as summarized in Table 1 and shown in FIG. 13. FIG. 13 is a plot of temperature vs. calender gap (microns) illustrating 3-layer adhesion results, 3 layer damage results, and 2 layer adhesion results. All tested conditions, except for the smaller gap on the tri-layer fabrication (380 μm), resulted in good adhesion of the laminate. The ASL-AFL lamination resulted in a compression of ~3%, while the ASL-ASL-AFL lamination step resulted in a compression of ~7%. This measurement found a lower limit to the set gap during ASL-ASL-AFL lamination of >380 μm to good adhesion.

TABLE 1

Summary of calendering conditions for 2$^{nd}$ trial of 3-layer laminates. Fill colors separate like conditions.

| | | Temp (° C.) | Speed (fpm) | Set Gap (um) | Config. | Initial thickness w/o mylar (um) | Final thickness w/o mylar (um) | Compressed percentage (%) | Comments |
|---|---|---|---|---|---|---|---|---|---|
| 1 | 1.1 | 130 | 6 | 254 | ASL-AFL | 245 | 240 | 2.04% | sticks well |
| | 1.2 | 130 | 6 | 380 | ASL-ASL-AFL | 462 | 440 | 4.76% | sticks but AFL damaged |
| 2 | 2.1 | 130 | 6 | 254 | ASL-AFL | 239 | 232 | 2.93% | sticks well |
| | 2.2 | 130 | 6 | 380 | ASL-ASL-AFL | 455 | 432 | 5.05% | sticks but AFL damaged |
| 3 | 3.1 | 130 | 6 | 254 | ASL-AFL | 275 | 267 | 2.91% | sticks well |
| | 3.2 | 130 | 6 | 406 | ASL-ASL-AFL | 505 | 480 | 4.95% | sticks well |
| 4 | 4.1 | 130 | 6 | 254 | ASL-AFL | 256 | 248 | 313% | sticks well |
| | 4.2 | 130 | 6 | 430 | ASL-ASL-AFL | 490 | 456 | 6.95% | sticks well |
| 5 | 5.1 | 130 | 6 | 305 | ASL-AFL | 256 | 242 | 5.47% | sticks well |
| | 5.2 | 130 | 6 | 406 | ASL-ASL-AFL | 488 | 445 | 8.81% | sticks well |
| 6 | 6.1 | 130 | 6 | 305 | ASL-AFL | 240 | 232 | 3.33% | sticks well |
| | 6.2 | 130 | 6 | 430 | ASL-ASL-AFL | 498 | 460 | 7.63% | sticks well |
| 8 | 8.1 | 140 | 6 | 254 | ASL-AFL | 236 | 228 | 3.39% | sticks well |
| | 8.2 | 140 | 6 | 406 | ASL-ASL-AFL | 454 | 430 | 5.29% | sticks well |
| 9 | 9.1 | 140 | 6 | 254 | ASL-AFL | 240 | 230 | 4.17% | sticks well |
| | 9.2 | 140 | 6 | 430 | ASL-ASL-AFL | 472 | 455 | 3.60% | sticks well |
| 10 | 10.1 | 140 | 6 | 305 | ASL-AFL | 248 | 242 | 2.42% | sticks well |
| | 10.2 | 140 | 6 | 306 | ASL-ASL-AFL | 495 | 456 | 7.88% | sticks well |
| 12 | 12.1 | 140 | 6 | 305 | ASL-AFL | 236 | 228 | 3.39% | sticks well |
| | 12.2 | 140 | 6 | 430 | ASL-ASL-AFL | 465 | 428 | 7.96% | sticks well |

Testing for calendering of 4-layers (ASL to ASL to AFL to electrolyte) was performed. In the 1$^{st}$ trial to make 4-layer laminates, two of the 3-layer laminates were run with an electrolyte layer. 4-layer lamination thus used ASL-AFL top-to-top, followed by ASL-ASL-AFL to-to-bottom, and finally ASL-ASL-AFL-GDC of bottom-to-top (ASL: Ni-YSZ, AFL: Ni-GDC, and electrolyte of GDC). The results are summarized in Table 2. The temperature and speed were kept the same as for the tri-layer and two gaps were tried, 430 and 460 μm. The smaller gap resulted in too much compression, while the larger gap was acceptable and the final 4-layer laminates in both cases exhibited good adhesion.

case, the set gap has a range that reports the minimum to maximum set gap across the much wider laminates. The ASL-AFL lamination to ASL step in the calendering process was considered to be the most important variable to modify, so three different set gap ranges were explored. The compression percentages and final thicknesses of the green

TABLE 2

Summary of calendering of 4-layer laminates

| Sr. No | Temp (° C.) | Speed (fpm) | Set gap (um) | Config. | Initial thickness w/o mylar (um) | Final thickness w/o mylar (um) | Compression (%) | Comments |
|---|---|---|---|---|---|---|---|---|
| 1 | 140 | 6 | 430 | ASL-ASL-AFL-GDC | 476 | 408 | 14.3% | GDC sticks very well on the AFL layer. Though a large compression is observed for the 4-layers. The high temperature and $2^{nd}$ round of calendaring (on ASL) probably impacts the thickness change to a greater extent. |
| 2 | 140 | 6 | 460 | ASL-ASL-AFL-GDC | 449 | 412 | 8.2% | The GDC sticks very well on the AFL. Also the compression after the $2^{nd}$ round calendaring (fpr the ASL) is well within the limit of <10%. |

Measurements were performed on samples that were ~1.5 in.×3 in. in size. 6-7 in. long strips ~2 in. long were fabricated to evaluate consistency along the length of a ~6 in. laminate needed to make the SOFC. The speed was also reduced to 4 fpm while the temperature was maintained at 140° C.

Figure 14:
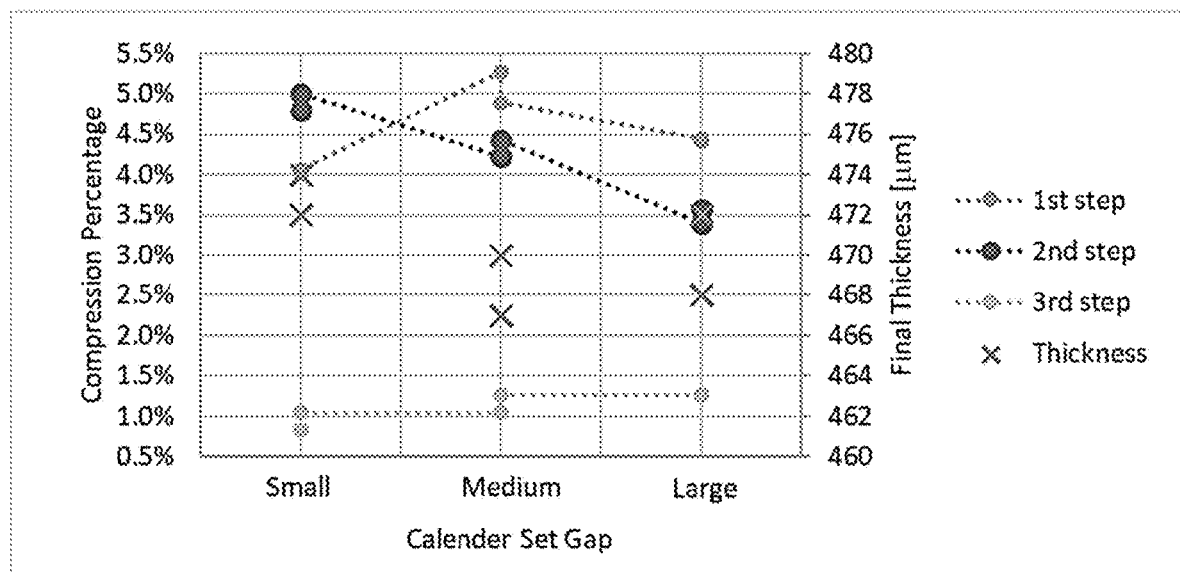
FIG. 14 shows the plot of compression percentage vs. calender gap for the three set gap ranges used in Table 3.

The calendering of 4-layers (ASL to ASL to AFL to electrolyte) for full-size SOFC laminates was also tested. The optimal conditions to ensure adhesion and minimal laminate deformation were developed with test samples in the previous section. Here, 6 in.×6 in. 4-layer SOFC laminates are fabricated for sintering and SOFC testing. In this laminates are shown graphically in FIG. 14. As set gap size decreases, the compression percentage increases, as expected. However, the final laminate thickness did not follow the same trend, the medium gap sample had the smallest average final thickness. This difference appears to result from a greater degree of compression during the first lamination step (ASL to AFL), even though the same set gap was used, and likely indicates a large variable in the manual process of lamination used.

TABLE 3

Calendering parameters and results for 4-layer 6 in. × 6 in. SOFC laminates.

| Redox Cell & Laminate ID (ORNL ID) | Temp. (° C.) | Speed (fpm) | Set gap (G) (um) | Configuration | Initial thickness w/o mylar (um) | Final thickness w/o mylar (um) | Compressed percentage (%) |
|---|---|---|---|---|---|---|---|
| IH 1-54 | 140 | 4 | 180 < G < 230 | ASL-AFL | 249 | 239 | 4.02% |
| LAM 104 | | | 365 < G < 406 | ASl-ASL-AFL | 480 | 457 | 4.79% |
| (5.3) | | | 406 < G < 457 | ASL-ASL-AFL-GDC | 478 | 474 | 0.84% |
| LAM103 | 140 | 4 | 180 < G < 230 | ASL-AFL | 246 | 236 | 4.07% |
| (3.3) | | | 365 < G < 406 | ASL-ASL-AFL | 480 | 456 | 5.00% |
| | | | 406 < G < 457 | ASL-ASL-AFL-GDC | 477 | 472 | 1.05% |
| 474 | 140 | 4 | 180 < G < 230 | ASL-AFL | 245 | 233 | 4.90% |
| LAM106 | | | 380 < G < 430 | ASL-ASL-AFL | 474 | 453 | 4.43% |
| (7.3) | | | 406 < G < 457 | ASL-ASL-AFL-GDC | 473 | 467 | 1.27% |
| LAM105 | 140 | 4 | 180 < G < 230 | ASL-AFL | 246 | 233 | 5.28% |
| (6.3) | | | 380 < G < 430 | ASL-ASL-AFL | 474 | 454 | 4.22% |
| | | | 406 < G < 457 | ASL-ASL-AFL-GDC | 475 | 470 | 1.05% |
| LAM101 | 140 | 4 | 180 < G < 230 | ASL-AFL | 249 | 238 | 4.42% |
| (1.3) | | | 406 < G < 457 | ASL-ASL-AFL | 475 | 458 | 3.58% |
| | | | 406 < G < 457 | ASL-ASL-AFL-GDC | 478 | 472 | 1.26% |
| IH 1-55 | 140 | 4 | 180 < G < 230 | ASL-AFL | 248 | 237 | 4.44% |
| LAM 102 | | | 406 < G < 457 | ASL-ASL-AFL | 470 | 454 | 3.40% |
| (2.3) | | | 406 < G < 457 | ASL-ASL-AFL-GDC | 474 | 468 | 1.27% |

Figure 15:
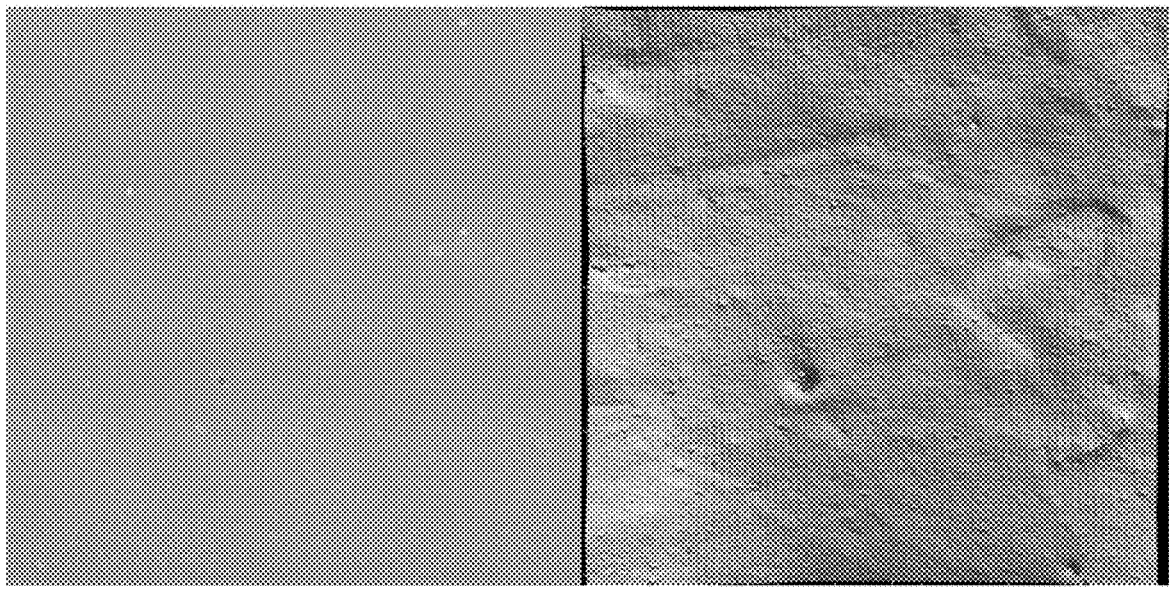
FIG. 15A shows the optical and FIG. 15 B shows the profilometry images of the electrolyte surface of the medium gap cell used in SOFC testing. The profilometry image is magnified 9 kx in the out-of-plane direction to aid in defect detection.
Figure 16:
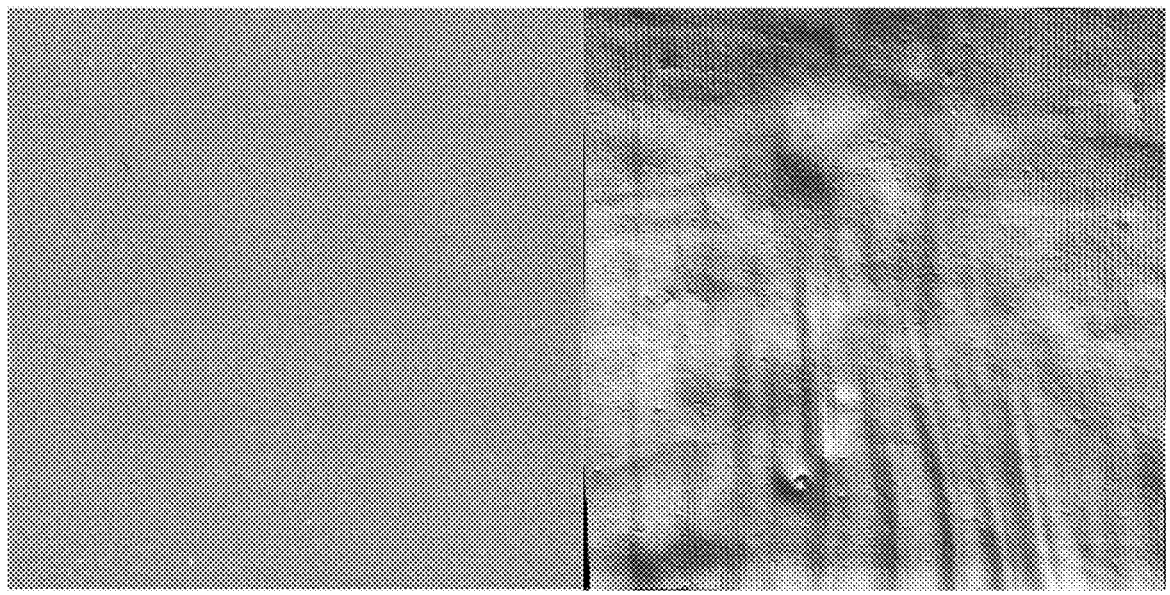
FIG. 16A shows the optical image of the electrolyte surface of the small gap cell used in SOFC testing.
FIG. 16B shows the profilometry images of the electrolyte surface of the small gap cell used in SOFC testing. The profilometry image is magnified 9 kx in the out-of-plane direction to aid in defect detection.

Optical images and profilometry of the SOFC tested cells are shown for medium (FIG. 15), small (FIG. 16), and large (FIG. 17) gap samples. In each case some discolorations can be observed on the surface, often with corresponding defects in the height profile. The range of heights shown for each height profile are the same, and the medium gap sample is a 4 cm×4 cm sample, while the small and large gap samples are 5 cm×5 cm samples. Each sample exhibits some impressions on the surface, with the vertical line processing defects most visible for the small gap sample. The small and large gap samples appear to generally suffer from the largest number of defects (in contrast to the full half-cell images above because of the area from which the laser cut cell was taken from), though, as will be shown later, the small and medium gap samples exhibit the best SOFC electrochemical performance, indicating robustness against observable defects. It is also worth noting that while these cells exhibit a greater level of defects, as observed by the metrology here, the defect concentration and type (except for the line defects) is not exceptionally worse than industrial cells made using conventional (i.e., not roll-to-roll) techniques. This indicates that the calendering process, with more improvement, should be able to replicate the level of defects in the standard processing route.

A voltage and power density curve for the medium gap SOFC measured at 650° C. after 150 h of operation is shown in FIG. 18. The OCV, ~0.78 V, is lower than a typical cell of the utilized SOFC structure, but is, in part, expected for the thinner GDC electrolyte layer used in the calendering trials. Additionally, defects, such as pinholes or cracks (possibly exacerbated by the horizontal and vertical lines described above), that may be introduced during calendering would further lower OCV. Moving to a thicker electrolyte and improved calendering process, or the slot die process discussed later, are expected to aid in increasing OCV and power density of the SOFC. Despite the lower OCV, the area-specific-resistance (ASR) is comparable to standard cells of the utilized SOFC structure (described below), and thus the power densities are not significantly lower than in the standard cell.

Figure 19:
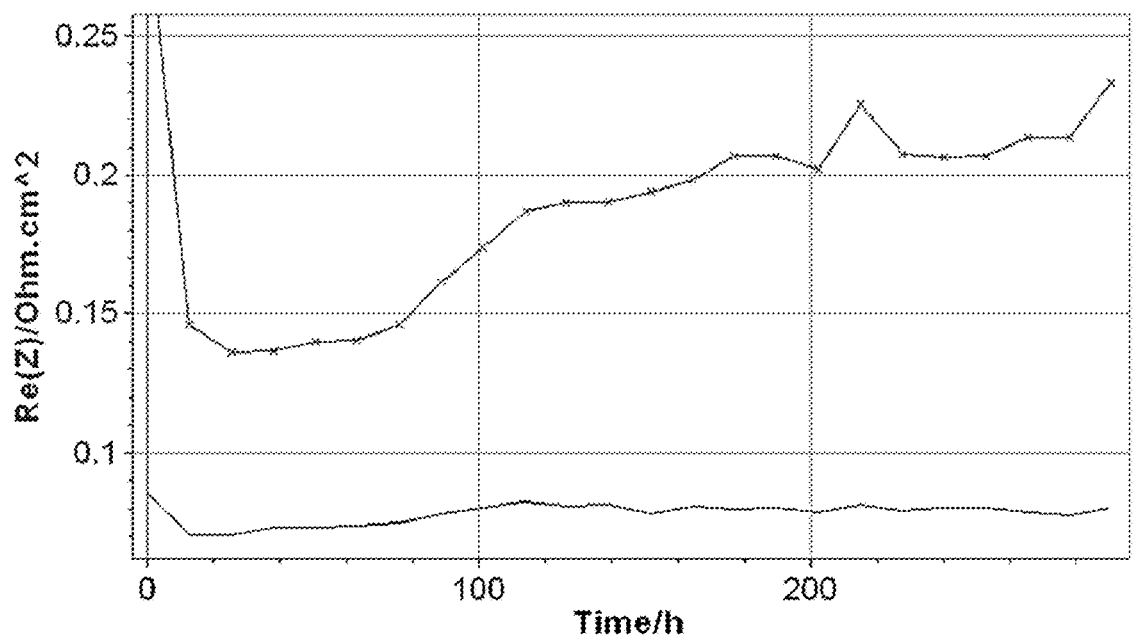
FIG. 19 is a plot of Re(Z)/ohm cm$^2$ vs time (hr) showing the total and ohmic ASR contributions to impedance measured at open circuit voltage (OCV) for the medium gap SOFC.

The area specific resistance (ASR) for the SOFC shown is in FIG. 19. The ohmic contribution to impedance (assumed to be the high frequency x-axis intercept in a Nyquist plot, as commonly done) is shown by the lower line, and is approximately 0.08 $\Omega$-cm$^2$. The total ASR, shown by the upper line, which includes the ohmic and electrode, or polarization, components (assumed to be the low frequency x-axis intercept in a Nyquist plot, as commonly done), first shows a drop after the first measurement, followed by a gradual increase with time. At ~150 h, the total ASR is ~0.19 $\Omega$-cm$^2$, meaning the electrode impedance is ~0.11 $\Omega$-cm$^2$. These values are similar to values typically observed on industrial cells of the utilized SOFC structure, indicating that low ASR is obtainable with the calendering process.

Figure 20:
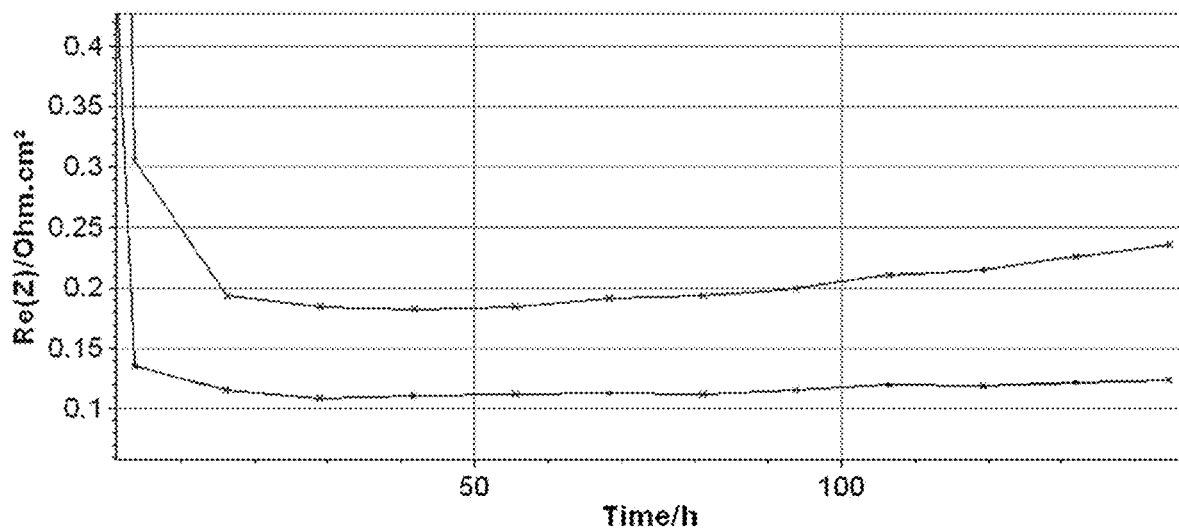
FIG. 20 is a plot of Re(Z)/ohm cm$^2$ vs time (hr) showing the total and ohmic ASR contributions to impedance measured at OCV for the small gap SOFC.
Figure 21:
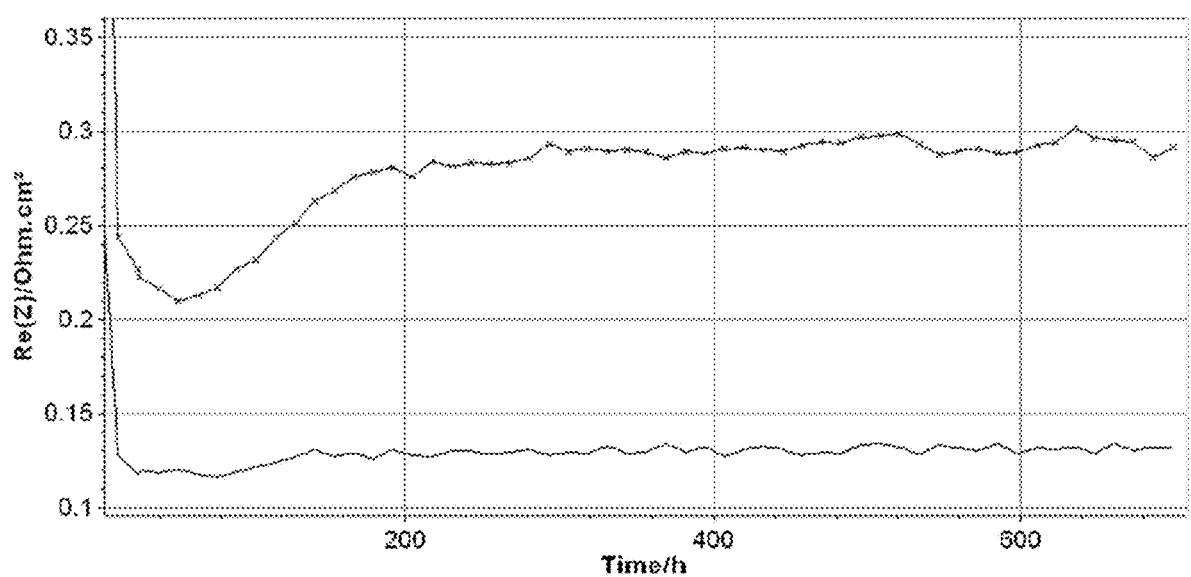
FIG. 21 is a plot of Re(Z)/ohm cm$^2$ vs time (hr) showing the total and ohmic ASR contributions to impedance measured at OCV for the large gap SOFC.

Additional ASR curves are shown for the small (FIG. 20) and large FIG. 21) gap samples. In these two samples, the ohmic ASR is about 0.11-0.13 $\Omega$-cm$^2$, larger than the medium gap sample. The electrode impedance at 150 h is 0.11 and 0.13 $\Omega$-cm$^2$ for the small and large gap samples, respectively, which is the same or larger than the medium gap sample. Based on these results, the medium gap sample processing conditions are the best, as they yield the lowest ASR. All samples showed similar OCV values of 0.78 and 0.785 V for small and large gap samples, respectively. The small gap sample is very similar to the medium gap sample in performance and thus should not be ruled out immediately for further testing in future work.

The long-term performance was also stable for the SOFC measurement up to ~700 h, as shown for the large gap sample in FIG. 21. After a burn-in up to about 200 h, the total and ohmic ASR contributions exhibit very little to no measurable change in value. This indicates the calendering process does not impact the long-term performance of the cells up to the measured conditions shown here. The small and medium gap tests were not evaluated beyond ~150-300 h due to limited test stand availability for this evaluation project.

Figure 22:
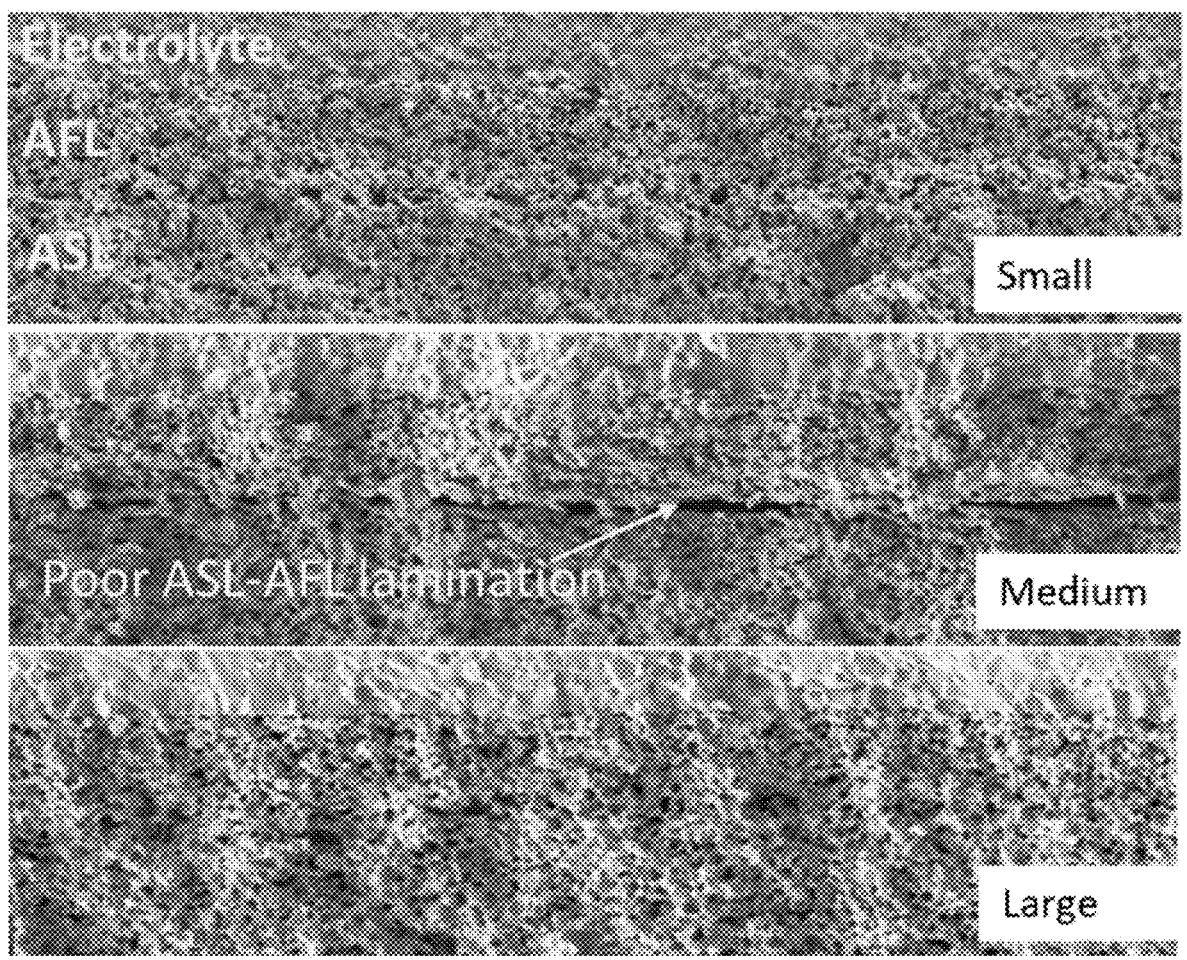
FIG. 22 shows images of fractured cross-sections of post-tested SOFC cells for the small, medium, and large gap samples.

Post-test microstructure images from scanning electron microscopy are shown in FIG. 22. Evidence for ASL-AFL poor adhesion during lamination is observed for the medium gap sample, but not in the small or large gap samples. Excellent lamination between electrolyte and AFL layers is observed for all samples in the images. Despite the poor lamination observed in the image for the medium gap sample, the cell electrochemical performance was the best of the three. Other areas of the sample showed good lamination quality. As described above, a more detailed analysis of adhesion across a much larger area of the sample than found in a cursory SEM investigation would be needed. However, the good adhesion observed between layers for the majority of the samples shows excellent promise for this manufacturing process.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A method of making a solid oxide fuel cell (SOFC), comprising the steps of:

providing a first SOFC layer laminate tape comprising a first SOFC layer composition attached to a flexible carrier film layer;

providing a second SOFC laminate tape comprising a second SOFC layer composition attached to a flexible carrier film layer;

providing a third SOFC layer laminate tape comprising a third SOFC layer composition attached to a flexible carrier film layer;

assembling the first SOFC layer laminate tape, the second SOFC layer laminate tape, and the third SOFC layer laminate tape on rolls positioned along a roll-to-roll assembly line;

continuously positioning adjacent to one another and moving the first SOFC layer laminate tape, and the second SOFC layer laminate tape, with the respective flexible carrier film layers facing outward, to create a SOFC precursor laminate having a first thickness;

passing the SOFC precursor laminate through a calender to reduce the thickness of the SOFC precursor laminate to a second thickness less than the first thickness;

continuously removing one of the respective flexible carrier film layers from the SOFC precursor laminate, the other of the flexible carrier film layers of the SOFC precursor laminate remaining;

continuously moving and positioning adjacent to one another the SOFC precursor laminate and the third SOFC layer laminate tape, with the respective flexible carrier film layers facing outward, to create a composite SOFC precursor laminate comprising the SOFC precursor laminate and the third SOFC layer laminate tape, the composite SOFC precursor laminate having a first thickness; and, calendering the composite SOFC precursor laminate to reduce the first thickness to a second thickness less that the first thickness to provide a composite SOFC laminate;

configuring the composite SOFC laminate into a terminal roll.

2. The method of claim 1, wherein the first SOFC layer composition, the second SOFC layer composition, and the third SOFC layer composition comprise, interchangeably, an anode support layer composition, an anode functional layer composition, and an electrolyte layer composition.

3. The method of claim 1, wherein:

providing the first SOFC layer laminate tape comprises providing an anode support layer laminate tape comprising an anode support layer attached to a flexible carrier film layer;

providing the second SOFC layer laminate tape comprises providing an anode functional layer laminate tape comprising an anode functional layer attached to a flexible carrier film layer;

providing the third SOFC layer laminate tape comprises providing an electrolyte layer laminate tape comprising an electrolyte layer attached to a flexible carrier film layer;

assembling the anode support layer laminate tape, the anode functional layer laminate tape, and the electrolyte layer laminate tape on rolls positioned along a roll-to-roll assembly line;

continuously positioning adjacent to one another and moving the anode functional layer laminate tape, and one of the electrolyte layer laminate tape and the support layer laminate tape, with the respective flexible carrier film layers facing outward, to create an anode precursor laminate having a first thickness;

passing the anode precursor laminate through a calender to reduce the thickness of the anode precursor laminate to a second thickness less than the first thickness;

continuously removing one of the respective flexible carrier film layers from the anode precursor laminate, the other of the tape layers of the anode precursor laminate remaining;

continuously moving and positioning adjacent to one another the anode precursor laminate, and the other of the electrolyte layer laminate tape and the support layer laminate tape, with the respective flexible carrier film layers facing outward, to create a composite fuel cell precursor laminate comprising the support layer, the anode layer, and the electrolyte layer, the composite fuel cell precursor layer having a first thickness; and, calendering the composite fuel cell precursor laminate to reduce the first thickness to a second thickness less that the first thickness.

4. The method of claim 1, further comprising the step of removing the flexible carrier film from the composite SOFC precursor laminate.

5. The method of claim 4, further comprising the step of applying a cathode layer to the composite SOFC precursor laminate to form a solid oxide fuel cell assembly.

6. The method of claim 5, further comprising the step of constructing a solid oxide fuel cell with the solid oxide fuel cell assembly.

7. The method of claim 4, further comprising the step of sintering the composite SOFC precursor laminate.

8. The method of claim 3, wherein the step of providing an anode support layer laminate tape comprises the step of providing an anode support layer slurry, depositing the anode support layer slurry on a flexible carrier film layer; and drying the anode support layer slurry to form the anode support layer precursor tape; and, the step of providing an anode functional layer laminate tape comprises the steps of providing an anode functional layer slurry, depositing the anode functional layer slurry on a flexible carrier film layer, and drying the anode functional layer slurry to form the anode functional layer precursor tape; and, the step of providing an electrolyte layer laminate tape comprises the steps of providing an electrolyte layer slurry, depositing the electrolyte layer slurry onto a flexible carrier film layer, and drying the electrolyte layer slurry to form the electrolyte layer precursor tape.

9. The method of claim 1, wherein at least one of the first, second and third SOFC layer compositions are deposited onto the flexible carrier film layer by at least one selected from the group consisting of slot die coating, dip coating, tape casting, and screen printing.

10. The method of claim 1, wherein at least one of the first, second and third SOFC layer compositions comprises a binder.

11. The method of claim 10, wherein the binder is at least one selected from the group consisting of polyvinyl butyral (PVB) and polyvinyl alcohol (PVA), polyethyl methacrylate, cellulose acetate, and polyvinyl alcohol.

12. The method of claim 1, wherein removal of the flexible carrier film layer from one of the first SOFC layer laminate tape, the second SOFC layer laminate tape, and the third SOFC layer laminate tape is performed by at least one selected from the group consisting of scraping and peeling.

13. The method of claim 1, wherein the roll-to-roll assembly line has a line speed of between 0.1 to 20 m/min.

14. The method of claim 1, wherein the method is performed at temperatures of between 0 to 250° C.

15. The method of claim 1, wherein after each lamination step the laminated layers are calendered to reduce the thickness between 0.1-40%.

16. The method of claim 1, further comprising cutting the rolls of the composite SOFC precursor laminate into SOFC coupons, and sintering the SOFC coupons for a predetermined sintering-time interval over a predetermined sintering-temperature range.

17. The method of claim 1, wherein the composite SOFC precursor laminate has a porosity of from 1% to 50%.

18. The method of claim 1, wherein the composite SOFC precursor laminate has a porosity of from 1% to 40%.

19. The method of claim 1, wherein the composite SOFC precursor laminate has a porosity of from 1% to 30%.

20. The method of claim 1, wherein the composite SOFC precursor laminate has a porosity of from 1% to 20%.

21. A method of making a solid oxide fuel cell (SOFC), comprising the steps of:

providing a first SOFC layer laminate tape comprising a first SOFC layer composition attached to a flexible carrier film layer;

providing a second SOFC laminate tape comprising a second SOFC layer composition attached to a flexible carrier film layer;

assembling the first SOFC layer laminate tape and the second SOFC layer laminate tape on rolls positioned along a roll-to-roll assembly line;

continuously positioning adjacent to one another and moving the first SOFC layer laminate tape, and the second SOFC layer laminate tape, with the respective flexible carrier film layers facing outward, to create a SOFC precursor laminate having a first thickness;

passing the SOFC precursor laminate through a calender to reduce the thickness of the SOFC precursor laminate to a second thickness less than the first thickness;

continuously removing one of the respective flexible carrier film layers from the SOFC precursor laminate, the other of the flexible carrier film layers of the SOFC precursor laminate remaining; and, configuring the SOFC precursor laminate into a terminal roll.

* * * * *